United States Patent
Miller et al.

(10) Patent No.: US 9,889,613 B2
(45) Date of Patent: Feb. 13, 2018

(54) MANUFACTURE OF INTEGRATED STRUCTURES FORMED OF COMPOSITE MATERIALS

(71) Applicant: ISRAEL AEROSPACE INDUSTRIES LTD.

(72) Inventors: Zev Miller, D.N Shimshon (IL); Daniel Itzchak Rubinstein, Mod'in (IL); Yaniv Yurovitch, D.N Shimson (IL); Harry Rosenfeld, Givatayim (IL); Jacob Ben Yaacov, Alfe Menashe (IL); Herman Leibovich, Rehovot (IL); Gila Ghilai, Holon (IL)

(73) Assignee: ISRAEL AEROSPACE INDUSTRIES LTD. (IL)

( * ) Notice: Subject to any disclaimer, the term of this patent is extended or adjusted under 35 U.S.C. 154(b) by 255 days.

(21) Appl. No.: 14/439,888

(22) PCT Filed: Oct. 31, 2013

(86) PCT No.: PCT/IL2013/050897
§ 371 (c)(1),
(2) Date: Apr. 30, 2015

(87) PCT Pub. No.: WO2014/068572
PCT Pub. Date: May 8, 2014

(65) Prior Publication Data
US 2015/0343720 A1    Dec. 3, 2015

Related U.S. Application Data

(60) Provisional application No. 61/721,111, filed on Nov. 1, 2012.

(51) Int. Cl.
*B29C 70/54* (2006.01)
*B29C 70/44* (2006.01)
(Continued)

(52) U.S. Cl.
CPC .......... *B29C 70/543* (2013.01); *B29C 70/085* (2013.01); *B29C 70/24* (2013.01);
(Continued)

(58) Field of Classification Search
CPC .................................................. B29C 70/543
(Continued)

(56) References Cited

U.S. PATENT DOCUMENTS 3,853,756 A    12/1974  Stana
4,591,400 A    5/1986   Fradenburgh et al.
(Continued)

FOREIGN PATENT DOCUMENTS

DE    19608127        9/1997
EP    1070661 A2      1/2001
(Continued)

OTHER PUBLICATIONS

Tommy Fristedt et al: "Novel Fiber Placement Technologies for Composite Applications SPE ACCE 2012 Tailored Fiber Placement Enabling Machine Solutions for Production and R&D", Aug. 27, 2012 (Aug. 27, 2012), XP055272456, Retrieved from the Internet: URL: http://www. speautomotive.com/SPEA CD/SPEA2012/pdf/ PF/PF6.pdf [retrieved on May 12, 2016].
(Continued)

*Primary Examiner* — Brent T O'Hern
(74) *Attorney, Agent, or Firm* — Ladas & Parry LLP

(57) ABSTRACT

A method for producing structures from composite materials, the method including forming a three-dimensional preform including at least one skin and a plurality of protrusions extending from the at least one skin, folding the three-dimensional preform such that at least some of the plurality of protrusions lie adjacent to either another one of the plurality of protrusions or the at least one skin and applying resin to the folded three-dimensional preform and curing,
(Continued)

thereby to produce the structures from adjacent pairs of the protrusions or from some of the protrusions and the at least one skin.

9 Claims, 27 Drawing Sheets

(51) Int. Cl.

| | | |
|---|---|---|
| B32B 3/04 | (2006.01) | |
| B32B 3/30 | (2006.01) | |
| B32B 3/28 | (2006.01) | |
| B32B 5/02 | (2006.01) | |
| B64C 3/20 | (2006.01) | |
| B29C 70/24 | (2006.01) | |
| B29C 70/30 | (2006.01) | |
| B29C 70/08 | (2006.01) | |
| B29K 105/08 | (2006.01) | |
| B29L 31/30 | (2006.01) | |
| B64C 9/00 | (2006.01) | |
| B29C 70/48 | (2006.01) | |

(52) U.S. Cl.
CPC .......... *B29C 70/30* (2013.01); *B29C 70/443* (2013.01); *B32B 3/04* (2013.01); *B32B 3/28* (2013.01); *B32B 3/30* (2013.01); *B32B 5/024* (2013.01); *B64C 3/20* (2013.01); *B29C 70/48* (2013.01); *B29K 2105/0809* (2013.01); *B29L 2031/3076* (2013.01); *B32B 2250/02* (2013.01); *B32B 2605/18* (2013.01); *B64C 2009/005* (2013.01); *Y02T 50/433* (2013.01); *Y10T 428/24215* (2015.01)

(58) Field of Classification Search
USPC .......................................... 428/124
See application file for complete search history.

(56) References Cited

U.S. PATENT DOCUMENTS

| | | | |
|---|---|---|---|
| 4,662,587 A | 5/1987 | Whitener | |
| 4,693,678 A | 9/1987 | Von Volkli | |
| 4,780,262 A | 10/1988 | Von Volkli | |
| 5,016,895 A | 5/1991 | Hollingsworth et al. | |
| 5,059,377 A | 10/1991 | Ashton et al. | |
| 5,087,187 A | 2/1992 | Simkulak et al. | |
| 5,332,178 A | 7/1994 | Williams | |
| 5,419,554 A | 5/1995 | Krone et al. | |
| 5,454,895 A | 10/1995 | Imparato | |
| 5,772,950 A | 6/1998 | Brustad et al. | |
| 5,963,660 A | 10/1999 | Koontz et al. | |
| 5,965,235 A * | 10/1999 | McGuire | B29C 51/225 156/209 |
| 6,112,617 A | 9/2000 | Abrams et al. | |
| 6,319,346 B1 | 11/2001 | Clark et al. | |
| 6,561,459 B2 | 5/2003 | Amaoka et al. | |
| 6,589,472 B1 | 7/2003 | Benson et al. | |
| 6,630,221 B1 | 10/2003 | Wong | |
| 6,743,504 B1 * | 6/2004 | Allen | B29C 70/446 428/188 |
| 6,896,841 B2 | 5/2005 | Velicki et al. | |
| 7,563,375 B2 | 7/2009 | Liberman | |
| 7,676,923 B2 | 3/2010 | Maille et al. | |
| 7,681,835 B2 | 3/2010 | Simpson et al. | |
| 7,889,907 B2 | 2/2011 | Engelbart et al. | |
| 8,068,659 B2 | 11/2011 | Engelbart et al. | |
| 2003/0042659 A1 | 3/2003 | Benson et al. | |
| 2003/0222371 A1 | 12/2003 | Edelmann et al. | |
| 2004/0031567 A1 | 2/2004 | Engelbart et al. | |
| 2004/0140048 A1 | 7/2004 | Lindsay et al. | |
| 2005/0151007 A1 | 7/2005 | Cadogan et al. | |
| 2006/0048659 A1 | 3/2006 | Colson et al. | |
| 2006/0121809 A1 | 6/2006 | Goering | |
| 2006/0249626 A1 | 11/2006 | Simpson et al. | |
| 2007/0034313 A1 | 2/2007 | Engelbart et al. | |
| 2007/0149080 A1 | 6/2007 | Asahara et al. | |
| 2007/0173966 A1 | 7/2007 | Oldani | |
| 2009/0039566 A1 | 2/2009 | Rodman | |
| 2009/0043533 A1 | 2/2009 | Brennan et al. | |
| 2009/0072090 A1 | 3/2009 | Kallinen et al. | |
| 2009/0163100 A1 | 6/2009 | Goering | |
| 2010/0006210 A1 * | 1/2010 | Kling | B65H 45/12 156/183 |
| 2010/0080941 A1 | 4/2010 | McCarville et al. | |
| 2010/0105268 A1 | 4/2010 | Ouellette et al. | |
| 2010/0166988 A1 | 7/2010 | Defoort et al. | |
| 2010/0213644 A1 | 8/2010 | Driver | |
| 2011/0003163 A1 | 1/2011 | Wood | |
| 2011/0121487 A1 * | 5/2011 | Topping | B29C 70/48 264/258 |
| 2011/0168324 A1 | 7/2011 | Ender | |
| 2013/0011605 A1 | 1/2013 | Miller | |

FOREIGN PATENT DOCUMENTS

| | | |
|---|---|---|
| EP | 2599604 A2 | 6/2013 |
| WO | 2013/005206 A1 | 1/2013 |
| WO | 2014/068572 A2 | 5/2014 |

OTHER PUBLICATIONS

European Search Report dated May 18, 2016, which issued during the prosecution of Applicant's European App No. 13850732.
International Preliminary Report on Patentability dated Jan. 7, 2014; PCT/IL2012/000226.
International Preliminary Report on Patentability dated May 5, 2015; PCT/IL2013/050897.
International Search Report and Written Opinion both dated Oct. 5, 2012; PCT/IL12/00226.
International Search Report and Written Opinion both dated Aug. 5, 2014; PCT/IL13/50897.
Extended European Search Report dated Jan. 27, 2015; Appln. No. 12807019.0-1703/2729301 PCT/IL2012000226.
USPTO RR dated Oct. 9, 2013 in connection with U.S. Appl. No. 13/176,067.
USPTO NFOA dated Apr. 23, 2014 in connection with U.S. Appl. No. 13/176,067.
USPTO FOA dated Sep. 25, 2014 in connection with U.S. Appl. No. 13/176,067.
USPTO NFOA dated Aug. 6, 2015 in connection with U.S. Appl. No. 13/176,067.
U.S. Appl. No. 61/721,111, filed Nov. 1, 2012.

* cited by examiner

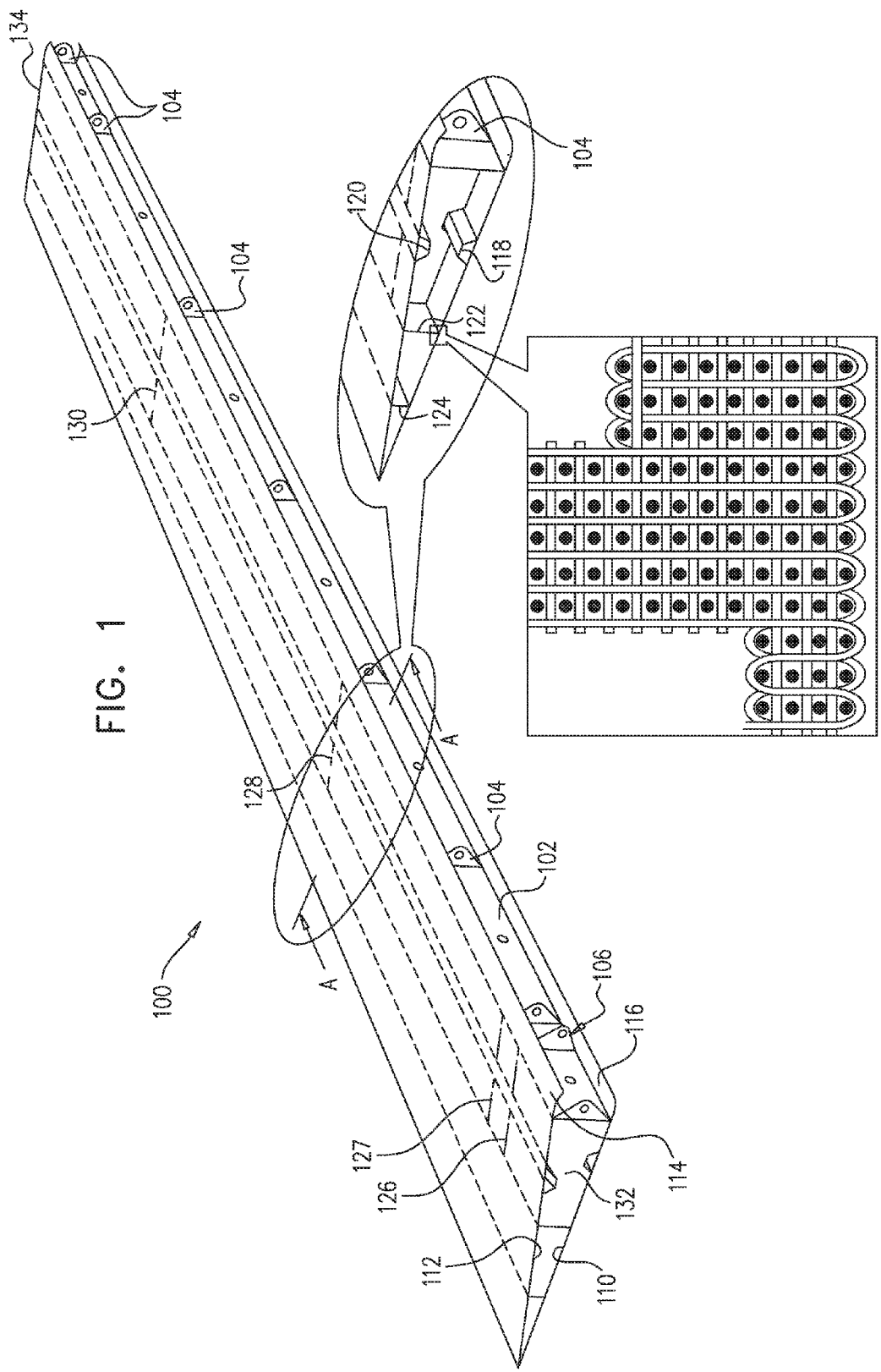

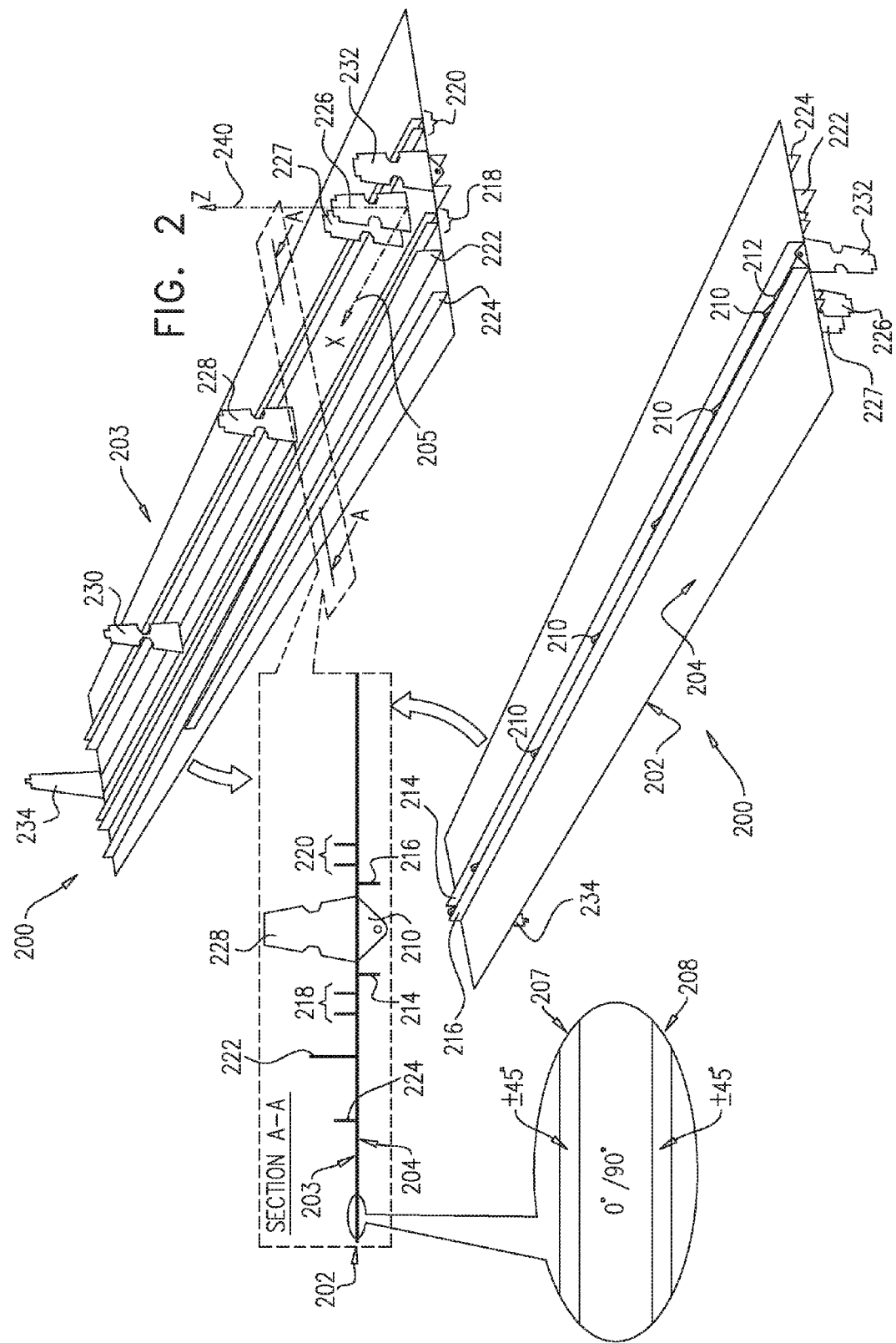

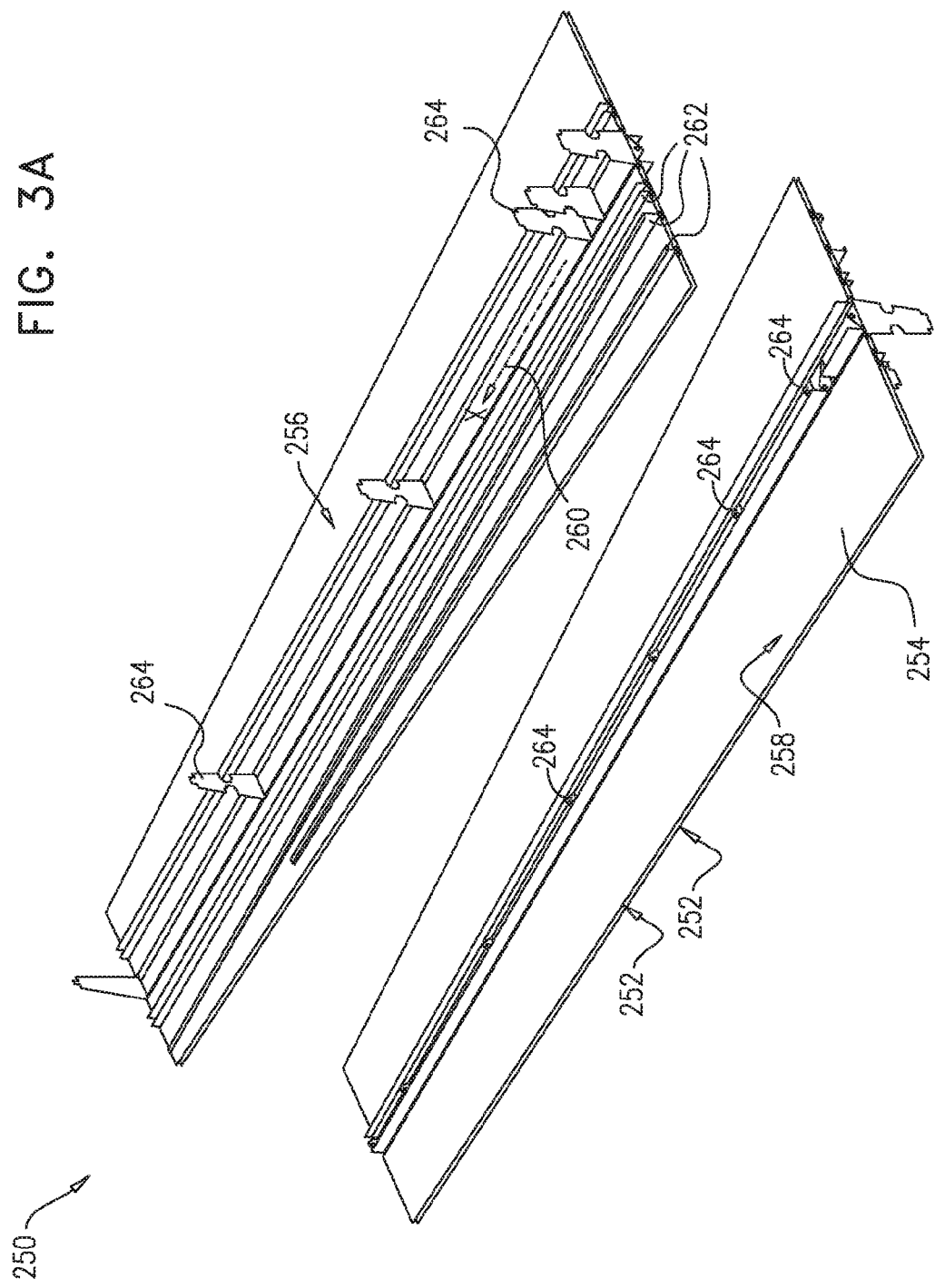

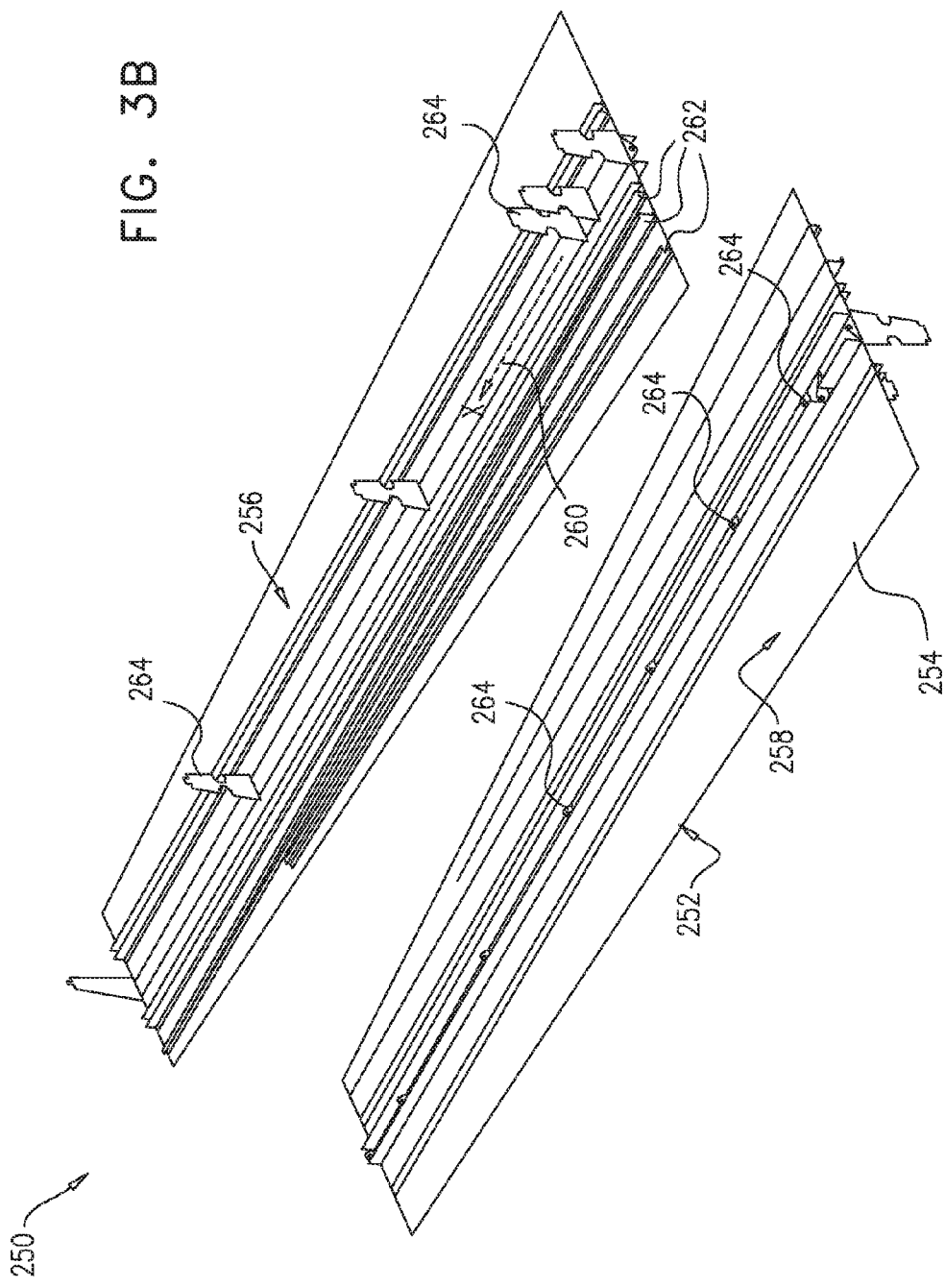

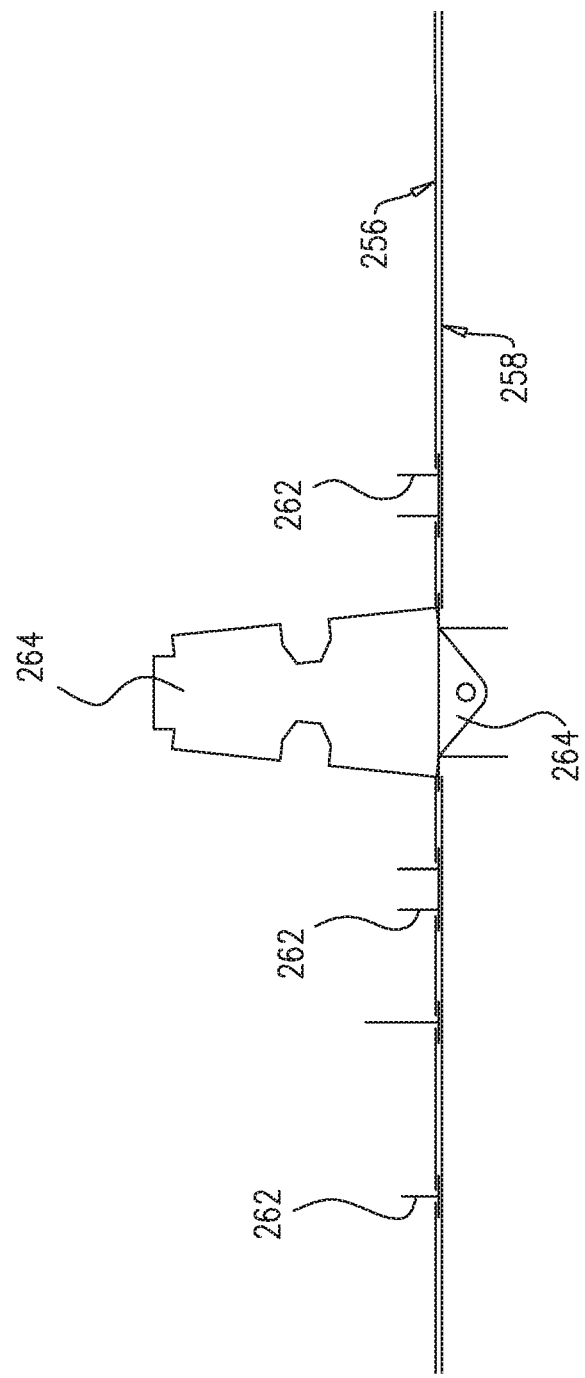

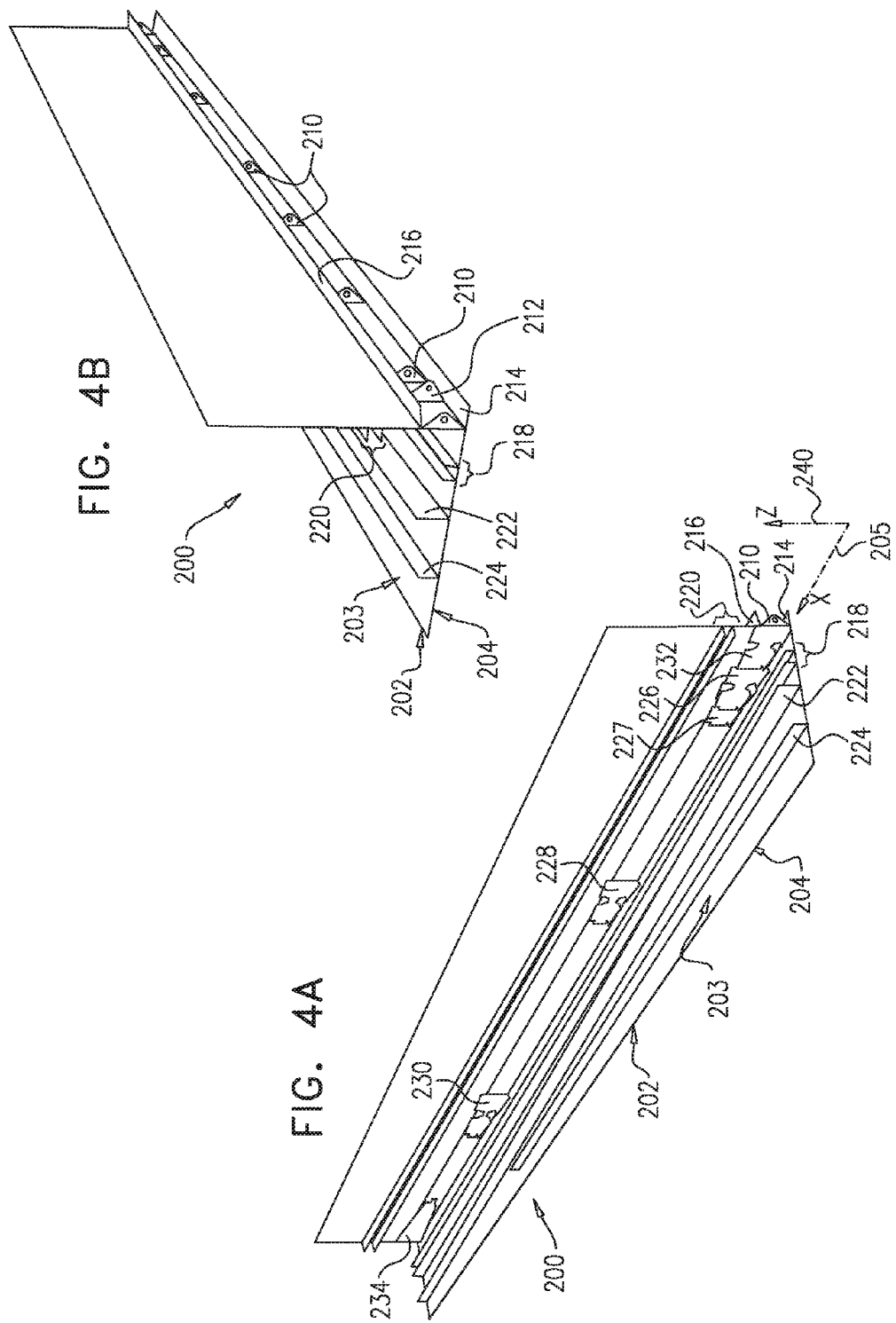

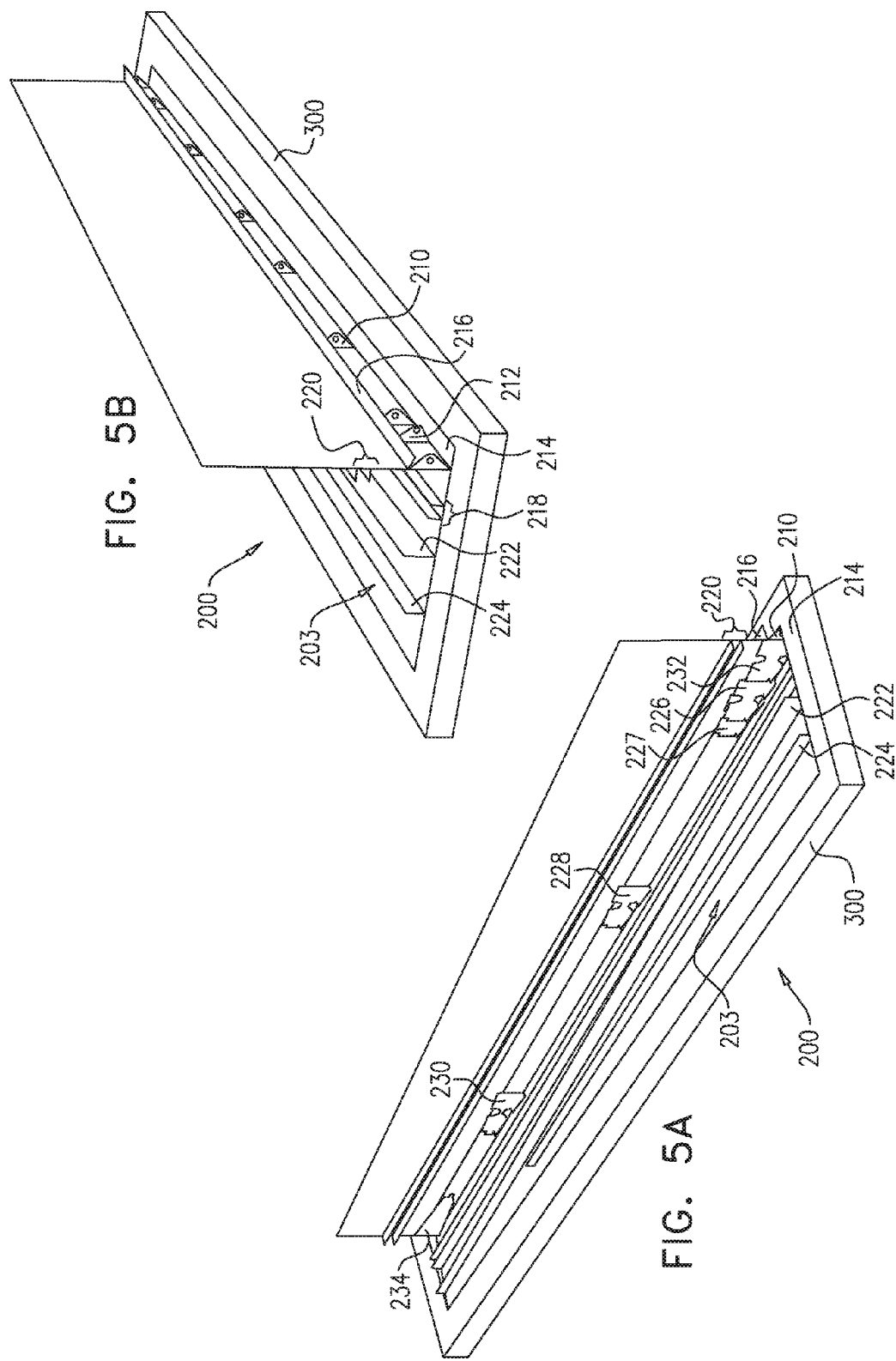

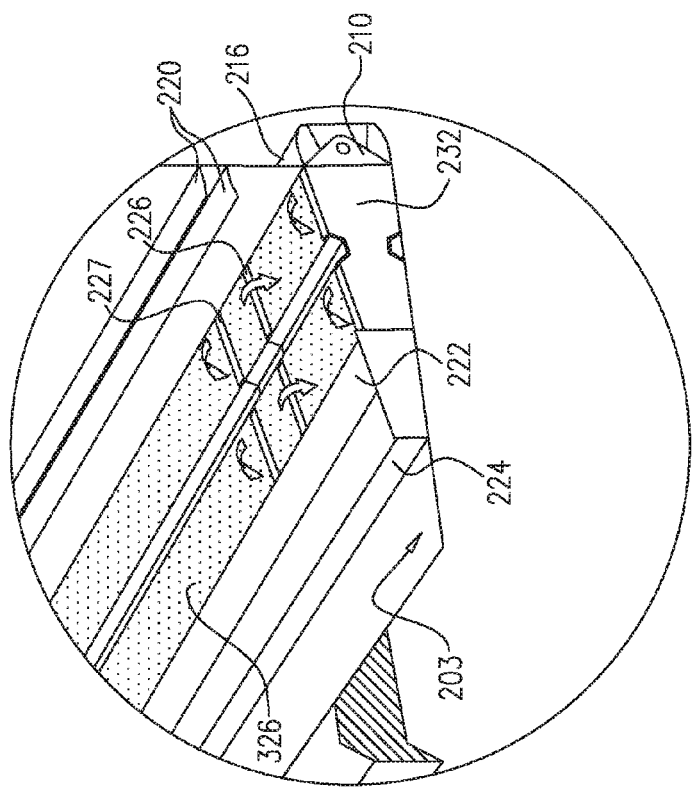
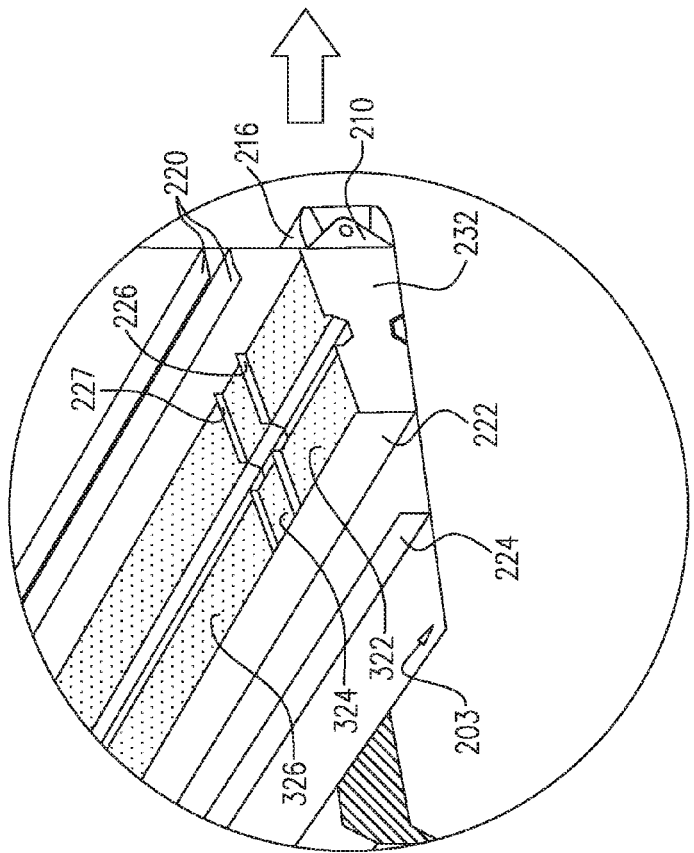
FIG. 12

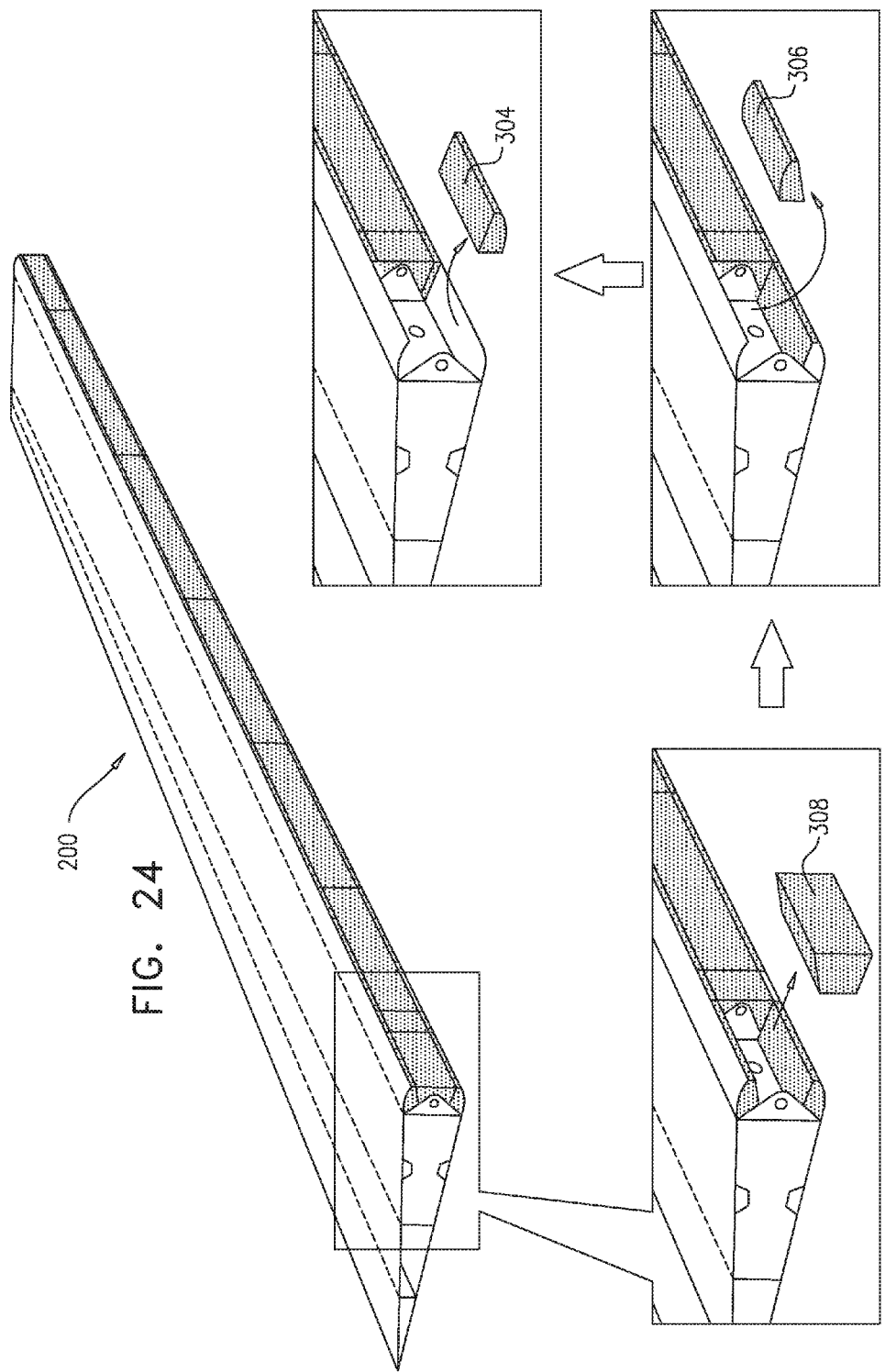

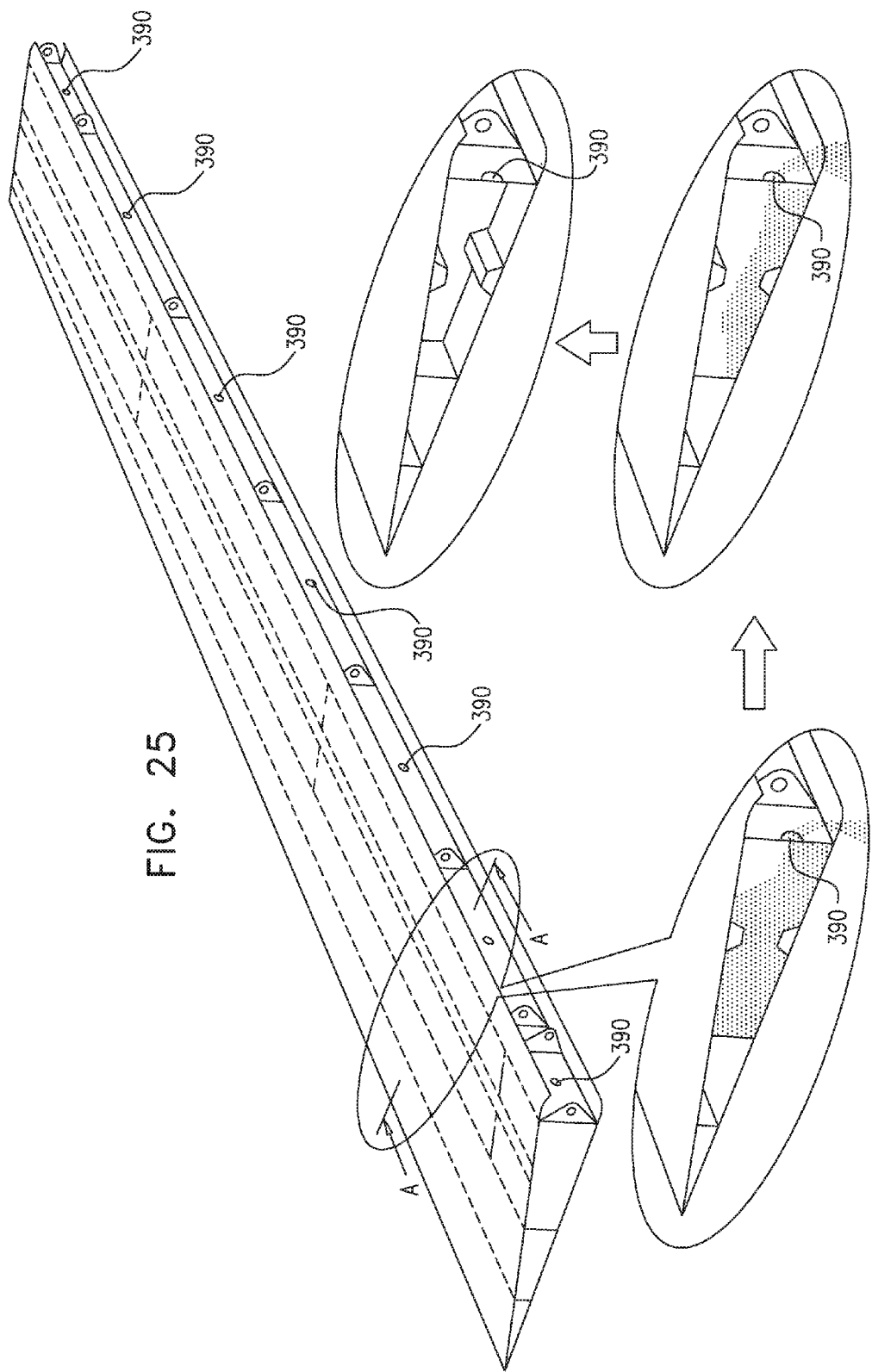

US 9,889,613 B2

MANUFACTURE OF INTEGRATED STRUCTURES FORMED OF COMPOSITE MATERIALS

REFERENCE TO RELATED APPLICATIONS

Reference is hereby made to U.S. Provisional Patent Application Ser. No. 61/721,111, filed Nov. 1, 2012 and entitled MANUFACTURE OF INTEGRATED STRUCTURES FORMED OF COMPOSITE MATERIALS, the disclosure of which is incorporated by reference in its entirety and priority of which is hereby claimed pursuant to 37 CFR 1.78(a) (4) and (5)(i).

FIELD OF THE INVENTION

The present invention relates to methods for producing structures from composite materials and to fiber preforms useful therein.

BACKGROUND OF THE INVENTION

Various techniques for producing structures from composite materials are known.

SUMMARY OF THE INVENTION

The present invention seeks to provide improved methods for producing structures from composite materials and fiber preforms useful therein.

There is thus provided in accordance with a preferred embodiment of the present invention a method for producing structures from composite materials, the method including forming a three-dimensional preform including at least one skin and a plurality of protrusions extending from the at least one skin, folding the three-dimensional preform such that at least some of the plurality of protrusions lie adjacent to either another one of the plurality of protrusions or the at least one skin and applying resin to the folded three-dimensional preform and curing, thereby to produce the structures from adjacent pairs of the protrusions or from some of the protrusions and the at least one skin.

Preferably, the three-dimensional preform is formed of a three-dimensional woven fabric. Alternatively, the three-dimensional preform is partially formed of a three-dimensional woven fabric.

In accordance with a preferred embodiment of the present invention the structure forms a part of an aircraft. Additionally or alternatively, the structure defines a movable control surface. Alternatively or additionally, the structure defines a lift surface.

Preferably, the preform includes at least one spar precursor. Alternatively or additionally, the preform includes at least one rib precursor. Additionally or alternatively, the preform includes at least one stiffener precursor.

In accordance with a preferred embodiment of the present invention the preform includes at least one hinge precursor. Additionally or alternatively, the preform includes at least one internal connecting element precursor.

There is also provided in accordance with another preferred embodiment of the present invention an article of manufacture produced by a method including forming a three-dimensional preform including at least one skin and a plurality of protrusions extending from the at least one skin, folding the three-dimensional preform such that at least some of the plurality of protrusions lie adjacent to either another one of the plurality of protrusions or the at least one skin and applying resin to the folded three-dimensional preform and curing, thereby to produce the structures from adjacent pairs of the protrusions or from some of the protrusions and the at least one skin.

Preferably, the three-dimensional preform is formed of a three-dimensional woven fabric. Alternatively, the three-dimensional preform is partially formed of a three-dimensional woven fabric.

In accordance with a preferred embodiment of the present invention the article of manufacture forms a part of an aircraft. Additionally or alternatively, the article of manufacture defines a movable control surface. Alternatively or additionally, the article of manufacture defines a lift surface.

Preferably, the preform includes at least one spar precursor. Alternatively or additionally, the preform includes at least one rib precursor. Additionally or alternatively, the preform includes at least one stiffener precursor.

In accordance with a preferred embodiment of the present invention the preform includes at least one hinge precursor. Additionally or alternatively, the preform includes at least one internal connecting element precursor.

BRIEF DESCRIPTION OF THE DRAWINGS

The present invention will be understood and appreciated from the following detailed description, taken in conjunction with the drawings in which:

FIG. 1 is a simplified illustration of a control surface constructed and operative in accordance with a preferred embodiment of the present invention;

FIG. 2 is a simplified pictorial illustration of a section and opposite sides of a preform employed in fabricating the control surface of FIG. 1 in accordance with a preferred embodiment of the present invention;

FIGS. 3A and 3B are simplified pictorial illustrations of an alternate preform which can be employed in fabricating the control surface of FIG. 1 in accordance with a preferred embodiment of the present invention;

FIG. 3C is a simplified sectional illustration of the preform of FIGS. 3A and 3B;

FIGS. 4A and 4B are simplified pictorial illustrations of opposite sides of the preform of FIG. 2 or FIGS. 3A-3C, following an initial folding step in accordance with a preferred embodiment of the present invention;

FIGS. 5A and 5B are simplified pictorial illustrations of opposite sides of the preform of FIGS. 4A & 4B following placement thereof in a bottom mold in accordance with a preferred embodiment of the present invention;

FIG. 12 is a simplified pictorial illustration of a further reorientation of rib defining protrusions on an inner side of the preform of FIG. 11 in accordance with a preferred embodiment of the present invention;

FIG. 24 is a simplified pictorial illustration of four general stages in extraction of leading edge tooling from the cured resin-infused preform of FIG. 23 in accordance with a preferred embodiment of the present invention; and FIG. 25 is a simplified pictorial illustration of one example of a technique for removal of trapped tools from the cured resin-infused preform of FIG. 24.

DETAILED DESCRIPTION OF PREFERRED EMBODIMENTS

Figure 6:
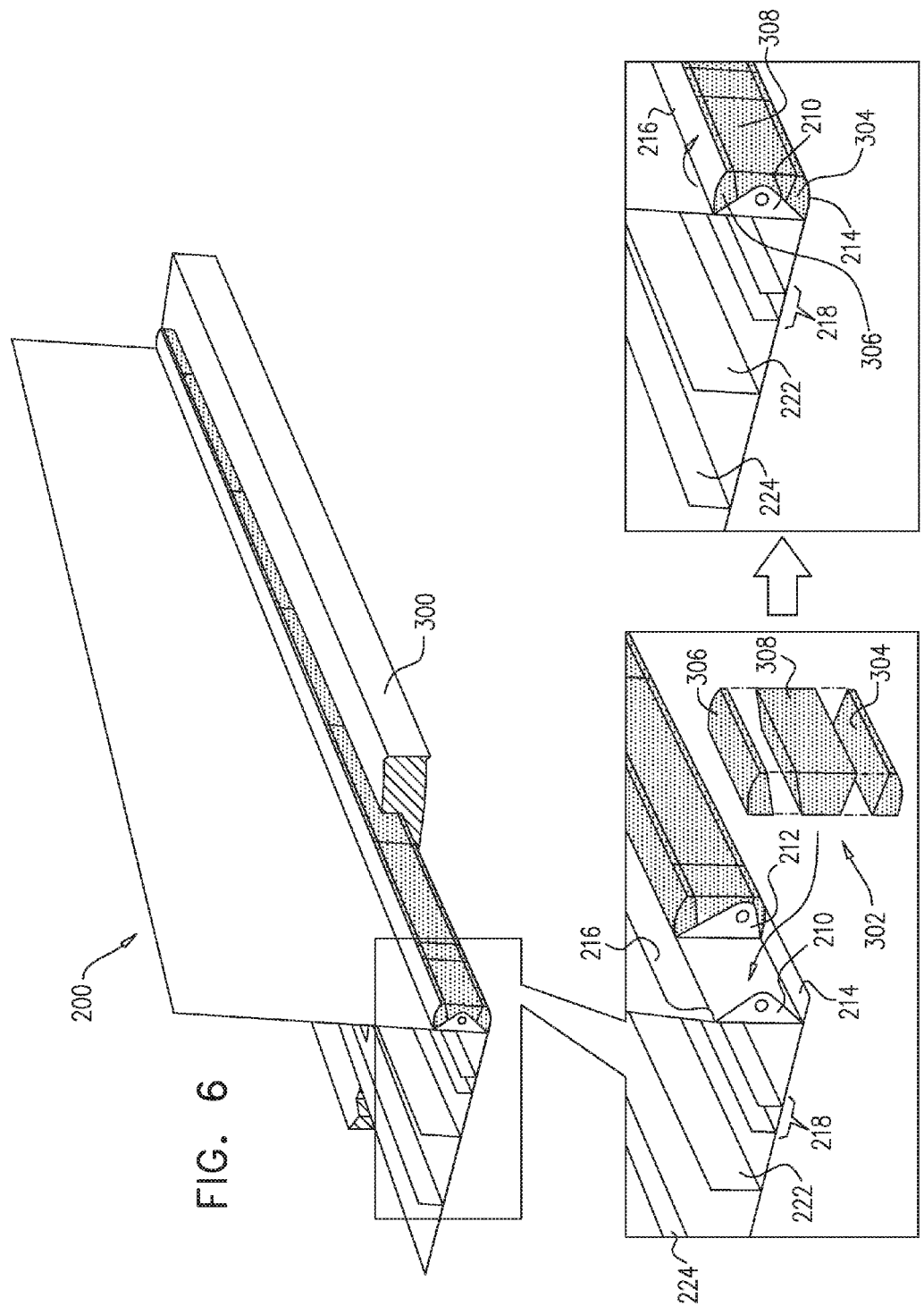
FIG. 6 is a simplified pictorial illustration of placement of leading edge tooling on an outer side of the preform of FIGS. 5A & 5B in accordance with a preferred embodiment of the present invention.

Reference is now made to FIG. 1, which is a simplified illustration of a control surface constructed and operative in accordance with a preferred embodiment of the present invention. In the illustrated embodiment of FIG. 1, the control surface is an elevator 100, which is shown upside down for the sake of consistency with the remainder of the drawings.

It is a particular feature of the present invention that the elevator 100 is formed of a three-dimensional preform, including a skin and a plurality of protrusions integrally formed with the skin and extending from the skin, by folding the three-dimensional preform such that at least some of the plurality of protrusions lie adjacent to either the skin or to another one of the plurality of protrusions and applying resin to the folded three-dimensional preform, thereby to produce portions of the elevator from adjacent pairs of the protrusions or from one of the protrusions and the skin. Preferably, essential parts of the three-dimensional preform are formed by three-dimensional weaving which produces a multi-ply preform including a multiple ply skin and multiple ply protrusions, wherein the multiple plies of the skin and of the protrusions are integrally joined together by continuous fibers in a woven structure.

As seen in FIG. 1, the elevator 100 includes a forward spar 102, extending along the entire length thereof and having integrally formed therewith a plurality of hinge elements 104 extending generally perpendicular to the forward spar 102, and an actuator attachment element 106.

The preform skin is folded to define first and second external surfaces 110 and 112, and protrusions from the skin define curved leading edges 114 and 116 respectively. Other protrusions from the skin are partially folded over each other and bonded together along the entire length of the elevator 100 to define stiffeners 118 and 120. Mid and aft spars 122 and 124 are also defined by protrusions from the skin which are partially folded over the skin and are bonded thereto. Internal ribs 126, 127, 128 and 130 and external ribs 132 and 134 each extend generally perpendicularly to spars 102, 122 and 124 and are defined by protrusions from the skin which are partially folded over the skin and are bonded thereto.

Reference is now made to FIG. 2, which is a simplified pictorial illustration of opposite sides of a preform employed in fabricating the control surface of FIG. 1 in accordance with a preferred embodiment of the present invention.

As seen in FIG. 2, the preform, here preferably formed at least partially by three-dimensional weaving and designated by reference numeral 200, includes skin 202 which has an inner surface 203 and an outer surface 204. Skin 202 is preferably constructed to have fibers extending parallel and perpendicular to its longitudinal axis 205. Preferably, auxiliary skin layers 207 and 208, preferably woven and having fibers extending at +/−45 degrees with respect to longitudinal axis 205, are attached to surfaces 203 and 204.

It is appreciated that additional layers 207 and 208 may be obviated if preform skin 202 includes fibers extending at +/−45 degrees with respect to longitudinal axis 205.

Integrally formed with the skin 202 on the outer surface 204 there are provided a plurality of protrusions 210 which define hinge elements 104, and a protrusion 212, which defines actuator attachment element 106.

Integrally formed with the skin 202 on the outer surface 204 there is also provided a first pair of adjacent elongate protrusions 214 and 216 which define curved leading edges 114 and 116 respectively.

Integrally formed with the skin 202 on the inner surface 203 there is provided a first pair of adjacent elongate protrusions 218, which, as will be described herein below, are partially folded over and bonded to each other to define stiffener 118. On the inner surface 203 there is also provided a second pair of adjacent elongate protrusions 220, which, as will be described herein below, are partially folded over and bonded to each other to define stiffener 120.

Integrally formed with the skin 202 on the inner surface 203 there are also provided elongate protrusions 222 and 224 which are partially folded over inner surface 203 of skin 202 and bonded thereto to define mid and aft spars 122 and 124 respectively. Integrally formed with the skin 202 on the inner surface 203 there are also provided protrusions 226, 227, 228, 230, 232 and 234, which are which are partially folded over inner surface 203 of skin 202 and bonded thereto to define internal ribs 126, 127, 128 and 130 and external ribs 132 and 134.

Preferably additional auxiliary skin layers, (not individually designated by reference numerals for the sake of conciseness), preferably woven and having fibers extending at +/−45 degrees with respect to longitudinal axis 205, are attached to opposite side surfaces of some or all of protrusions 222, 224, 210, 212, 214, 216, 218, 220. Preferably, auxiliary skin layers, preferably woven and having fibers extending at +/−45 degrees with respect to an axis 240, perpendicular to the plane of skin 202 are attached to opposite side surfaces of some or all of protrusions 226, 227, 228, 230, 232 and 234.

It is appreciated that protrusions 210, 212, 214, 216, 218, 220, 222 and 224 are typically integrally formed with skin 202 and generally lie in the same plane as skin 202 or a plane parallel to the plane of skin 202, but are later folded to lie perpendicular to the plane of skin 202, as shown in FIG. 2. It is appreciated that protrusions 226, 227, 228, 230, 232 and 234, are typically integrally formed with skin 202 and generally lie in the same plane as skin 202 or a plane parallel to the plane of skin 202, as seen in FIGS. 4A and 5A, but, for clarity, are shown in FIG. 2 in a perpendicular orientation relative to the plane of skin 202.

Reference is now made to FIGS. 3A and 3B, each of which is a simplified pictorial illustration of an opposite side of an alternative preform which can be employed in fabricating the control surface of FIG. 1 in accordance with a preferred embodiment of the present invention, and to FIG. 3C, which is a simplified sectional illustration of the preform of FIGS. 3A and 3B.

As seen in FIG. 3A, the preform, here preferably formed at least partially by three-dimensional weaving and designated by reference numeral 250, preferably includes multiple layers 252 of skins 254, including at least one inner layer 256 and at least one outer layer 258. Each of skins 254 is preferably constructed by stacking plies with fibers extending parallel to, perpendicular to and at +/−45 degrees with respect to a longitudinal axis 260 of preform 250.

As seen in FIGS. 3A-3C, in the illustrated embodiment, inner layer 256 and outer layer 258 each include multiple plies joined to preforms formed with a plurality of elongate protrusions 262, similar in function to protrusions 214, 216, 218, 200, 222 and 224 of the embodiment of FIG. 2, and as well as a plurality of protrusions 264, similar in function to protrusions 210, 212, 226, 227, 228, 230, 232 and 234 of the embodiment of FIG. 2.

It is appreciated that in the embodiment shown in FIGS. 3A-3C, parts of the preform, particularly those parts which define junctions of the completed structure, are preferably formed using three-dimensional weaving, while parts which do not define junctions of the completed structure may be made by stacking conventional fabrics, such as woven fabrics, 'unidirectional' fabrics, and non-crimp stitched fabrics (NCF).

It is further appreciated that the multiple parts comprising preform 250 may be joined together prior to infusion by conventional attachment methods, such as, stitching, temporary bonding with a tackifier, or other suitable attachment methods. Additionally, while the illustrated embodiment of FIGS. 3A-3C shows a specific combination of preform parts, it is appreciated that any suitable combination of preform parts providing the required preform configuration may be utilized.

Reference is now made to FIGS. 4A and 4B, which are simplified pictorial illustrations of opposite sides of the preform of FIG. 2 or FIGS. 3A-3C, following an initial folding step in accordance with a preferred embodiment of the present invention. It is seen that in this initial folding step, the skin is folded parallel to longitudinal axis 205 generally along a line at which elongate protrusion 214 is joined to skin 202.

Reference is now made to FIGS. 5A and 5B, which are simplified pictorial illustrations of opposite sides of the preform of FIGS. 4A & 4B following placement thereof in a bottom mold 300.

Figure 7:
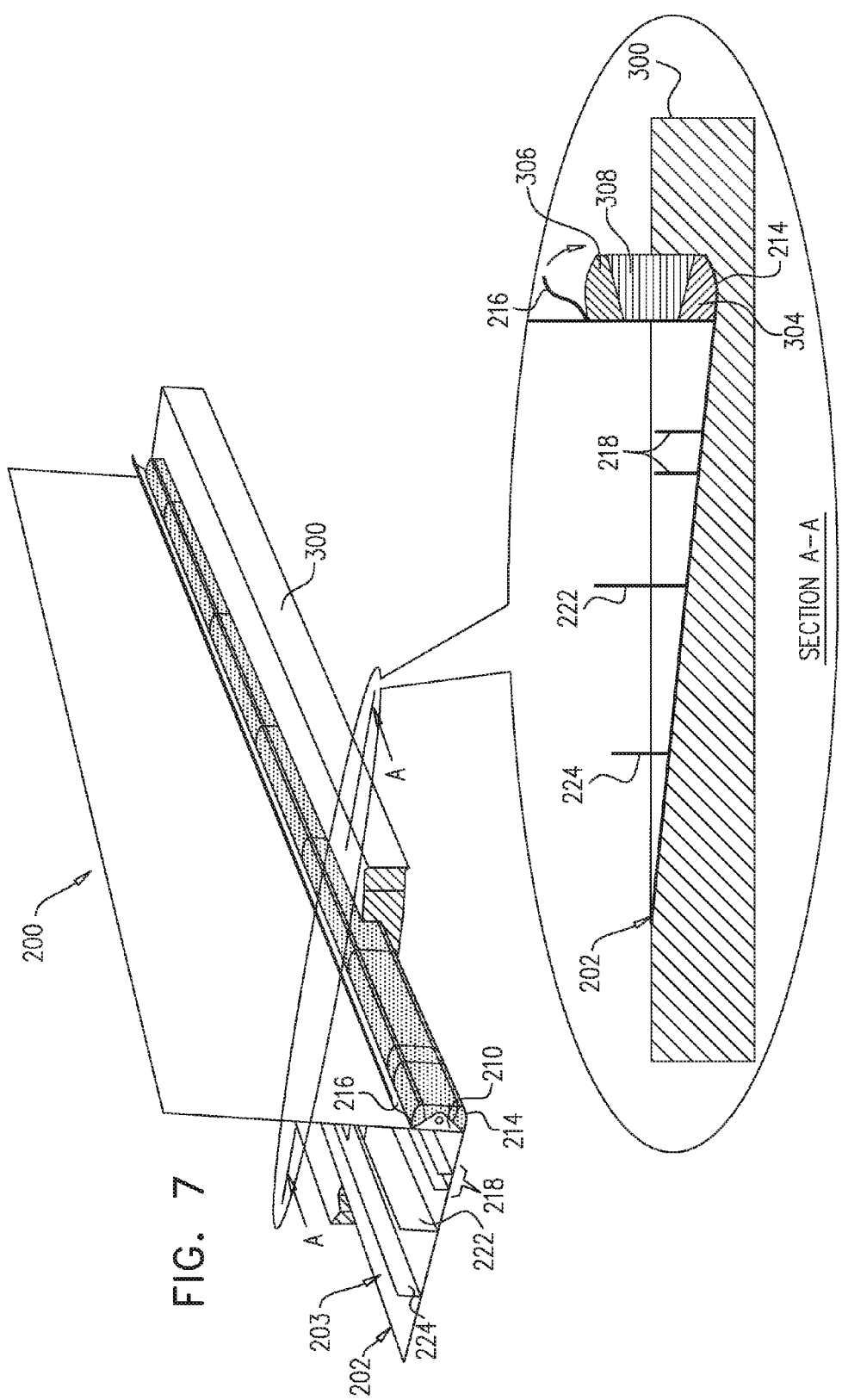
FIG. 7 is a simplified pictorial illustration of folding leading edge protrusions over leading edge tooling on an outer side of the preform of FIG. 6 in accordance with a preferred embodiment of the present invention.

Reference is now made to FIG. 6, which is a simplified pictorial illustration of placement of leading edge tooling on an outer side of the preform of FIGS. 5A & 5B, and to FIG. 7, which is a simplified pictorial illustration of folding leading edge protrusions over leading edge tooling on an outer side of the preform of FIG. 6.

As seen in FIG. 6, the leading edge tooling preferably includes a plurality of tool assemblies 302, each of which is inserted between adjacent ones of protrusions 210 and 212. Each tool assembly 302 includes a lower curved tool portion 304, an upper tool portion 306 and a keystone tool portion 308. As seen in FIGS. 6 and 7, following placement of tooling assemblies 302, elongate protrusion 216 is folded to lie over the top of upper tool portions 306 of tooling assemblies 302.

Figure 8:
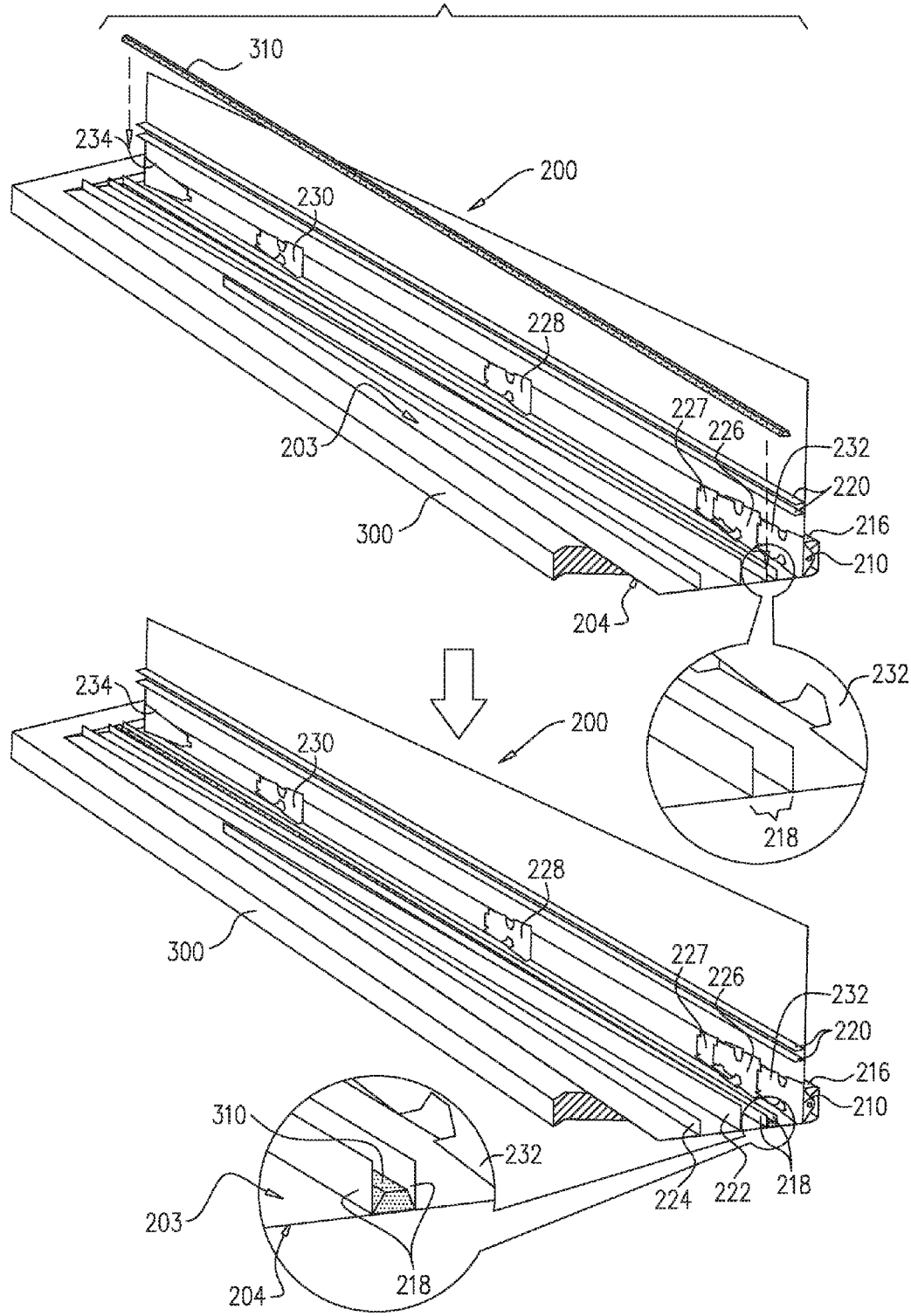
FIG. 8 is a simplified pictorial illustration of first placement of stiffener tooling on an inner side of the preform of FIG. 7 in accordance with a preferred embodiment of the present invention.
Figure 9:
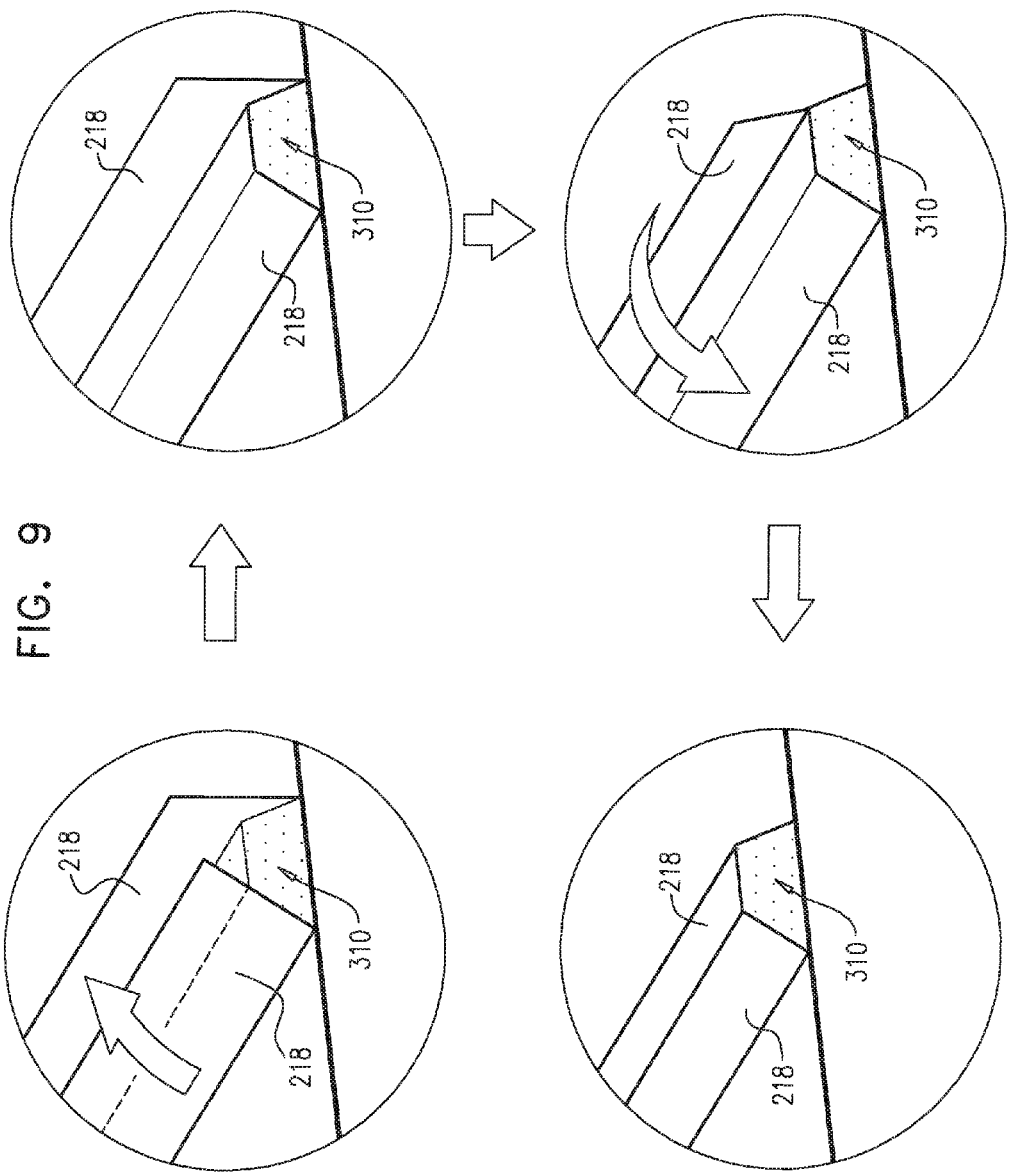
FIG. 9 is a simplified pictorial illustration of four general stages in folding stiffener protrusions over stiffener tooling on an inner side of the preform of FIG. 8 in accordance with a preferred embodiment of the present invention.

Reference is now made to FIG. 8, which is a simplified pictorial illustration of placement of a first stiffener tooling on an inner side of the preform of FIG. 7, and to FIG. 9, which is a simplified pictorial illustration of four general stages in folding stiffener protrusions over stiffener tooling on an inner side of the preform of FIG. 8.

As seen in FIG. 8, stiffener tooling 310 is placed on an inner side of the preform of FIG. 7. The stiffener tooling 310 is typically an elongate element having a generally trapezoidal cross section and is placed between protrusions 218. FIG. 9 shows four typical stages in folding protrusions 218 over stiffener tooling 310.

Figure 10:
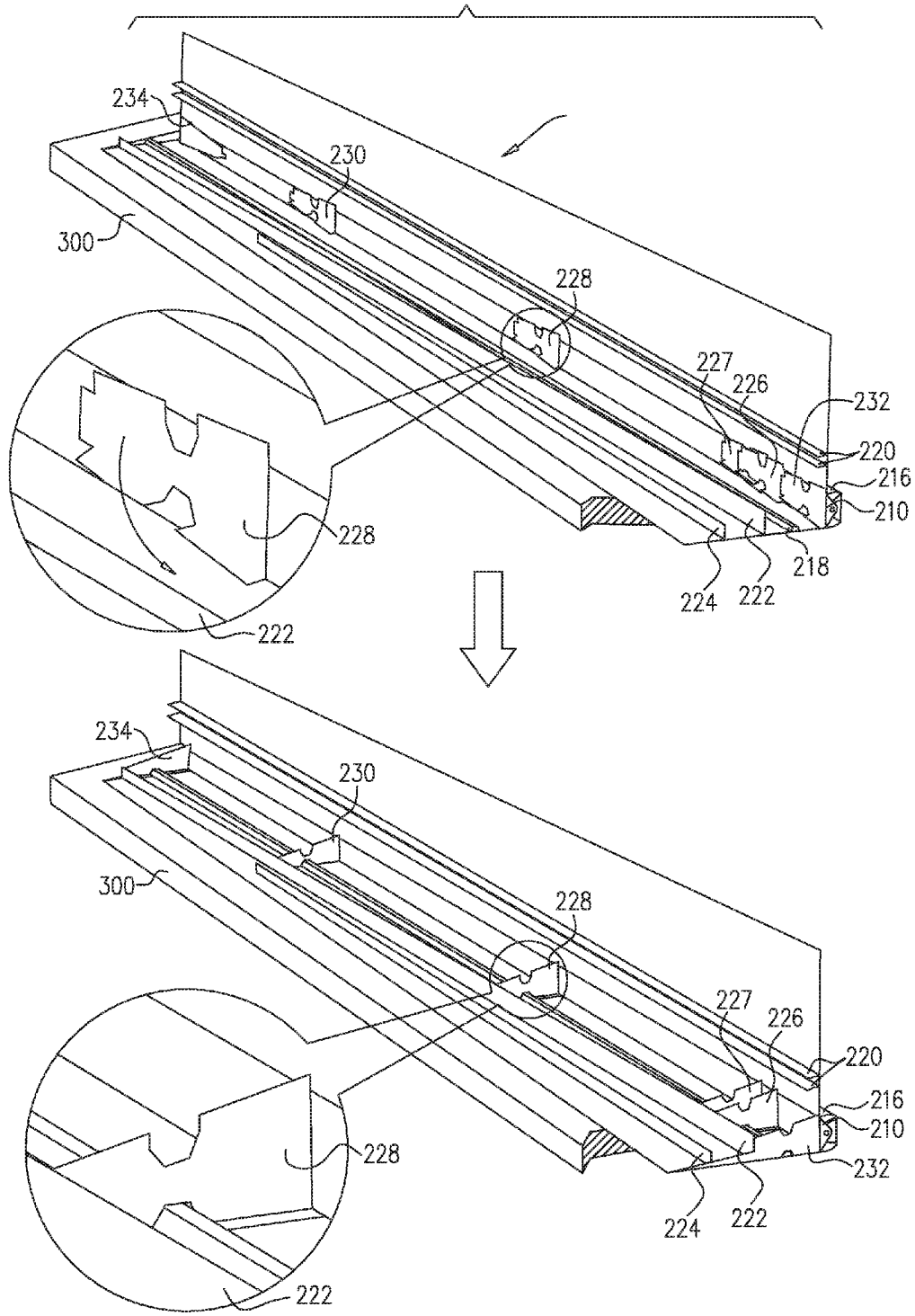
FIG. 10 is a simplified pictorial illustration of an initial reorientation of rib defining protrusions on an inner side of the preform of FIG. 8 in accordance with a preferred embodiment of the present invention.

Reference is now made to FIG. 10, which is a simplified pictorial illustration of an initial reorientation of rib defining protrusions 226, 227, 228, 230, 232 and 234 on an inner side of the preform of FIG. 8. As seen in FIG. 10, rib defining protrusions 226, 227, 228, 230, 232 and 234, which lie generally in the plane of skin 202 or a plane parallel to skin 202, are reoriented to lie in a plane generally perpendicular to the plane of skin 202.

Figure 11:
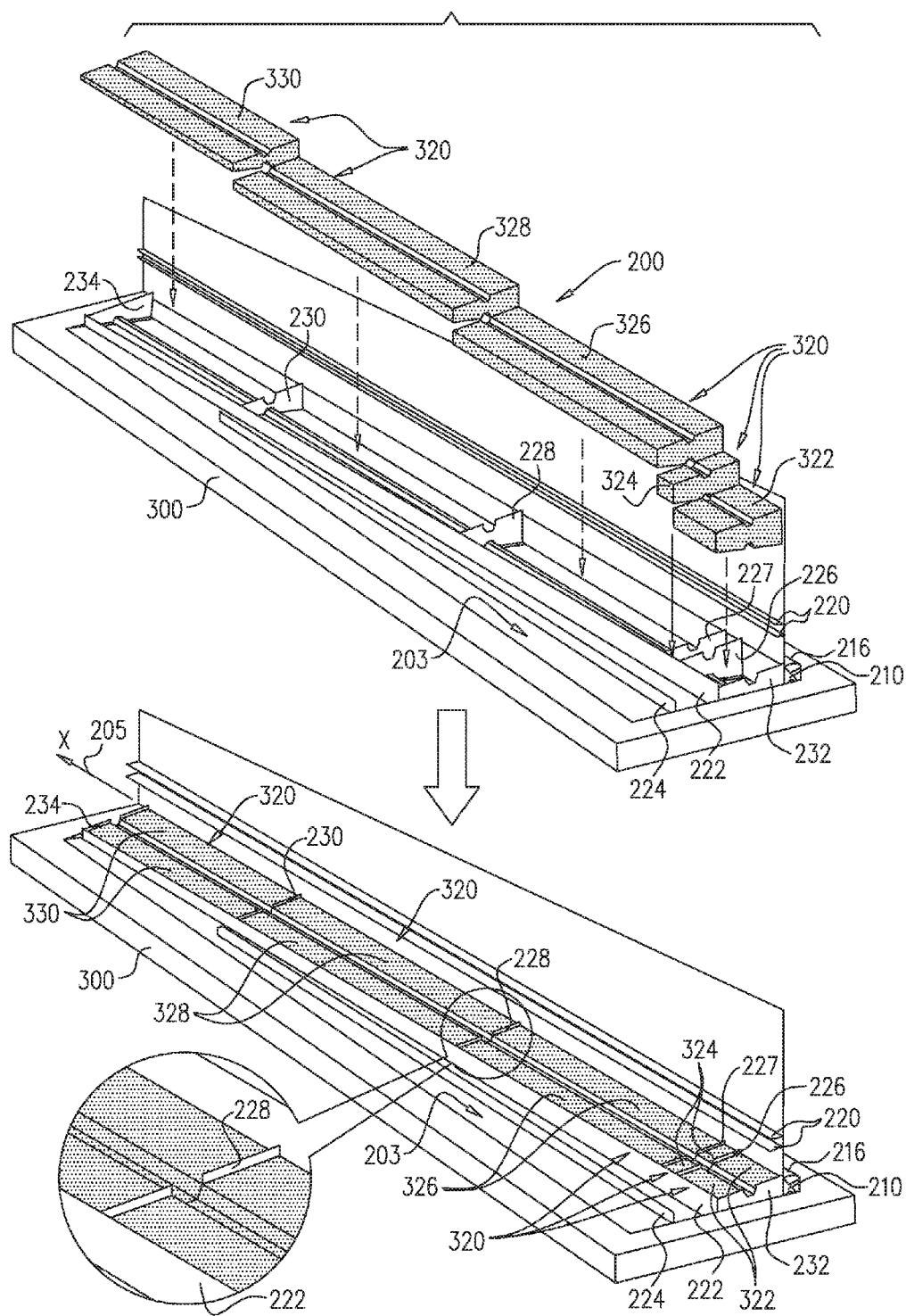
FIG. 11 is a simplified pictorial illustration of placement of forward bay tooling on an inner side of the preform of FIG. 10 in accordance with a preferred embodiment of the present invention.

Reference is now made to FIG. 11, which is a simplified pictorial illustration of placement of forward bay tooling on an inner side of the preform of FIG. 10, and to FIG. 12, which is a simplified pictorial illustration of a further reorientation of rib defining protrusions on an inner side of the preform of FIG. 11.

As seen in FIG. 11, forward bay tooling 320 is placed on an inner side of the preform of FIG. 10. Preferably, forward bay tooling 320 comprises a plurality of forward bay tool elements 322, 324, 326, 328 and 330 positioned intermediate respective reoriented rib defining protrusions 226, 227, 228, 230, 232 and 234. It is seen that typically each of forward bay tool elements 322, 324, 326, 328 and 330 has a truncated triangular cross section having elongate recesses extending generally along an axis parallel to longitudinal axis 205, which elongate recesses preferably have a generally trapezoidal cross section in order to accommodate stiffeners 118 and 120 (FIG. 1). It is also noted that in the illustrated example, forward bay tool elements 322, 324, 326, 328 and 330 are of generally decreasing cross sectional area. Preferably, forward bay tool elements 322, 324, 326, 328 and 330 are convertible to a fluid or suspension which can be readily removed after curing of elevator 100.

FIG. 12 is a simplified pictorial illustration of a further reorientation of rib defining protrusions 226, 227, 228, 230, 232 and 234 typically by folding a top edge of each of the rib defining protrusions over an adjacent end of one of forward bay tool elements 322, 324, 326, 328 and 330.

Figure 13:
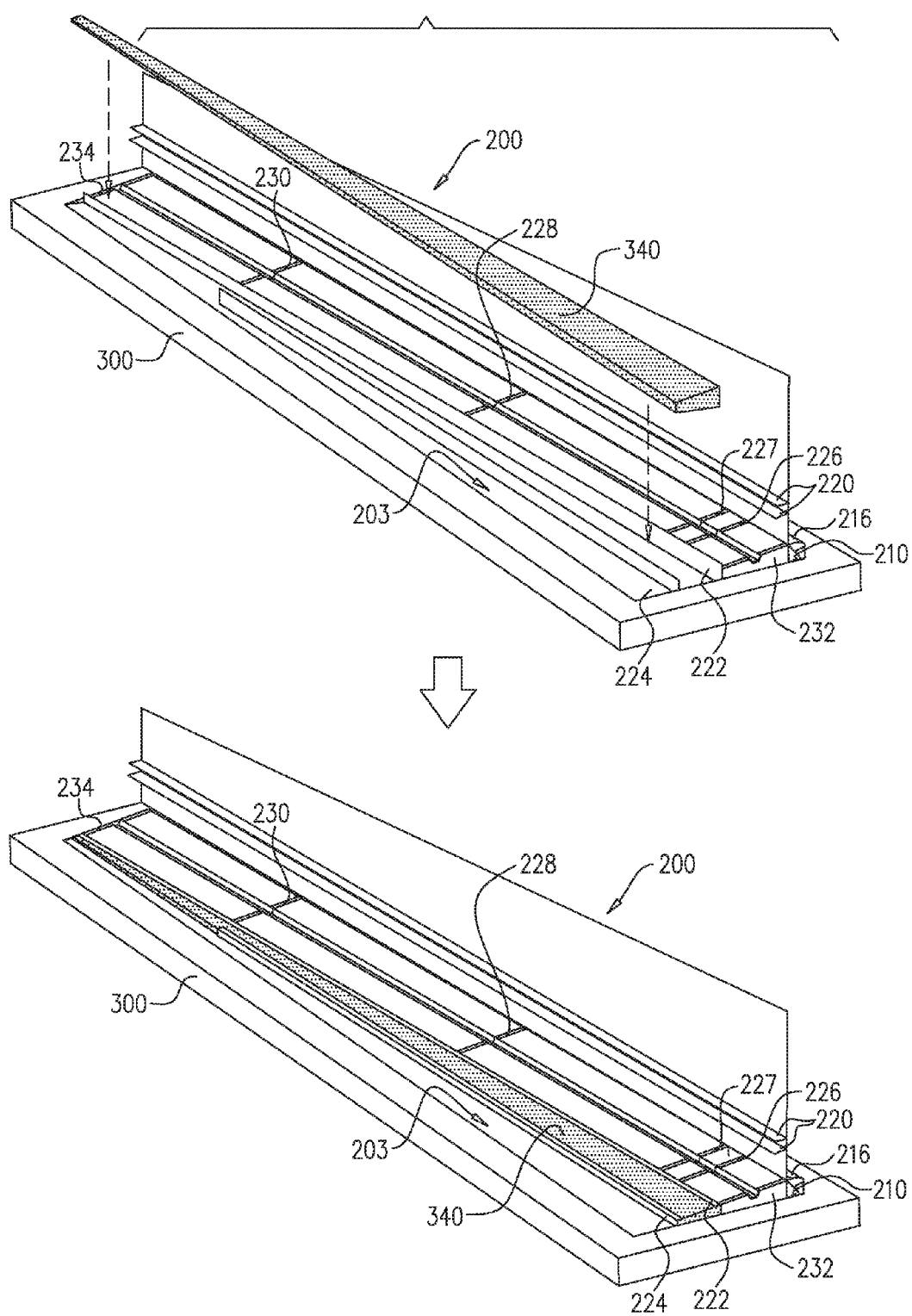
FIG. 13 is a simplified pictorial illustration of placement of mid bay tooling on an inner side of the preform of FIG. 12 in accordance with a preferred embodiment of the present invention.
Figure 14:
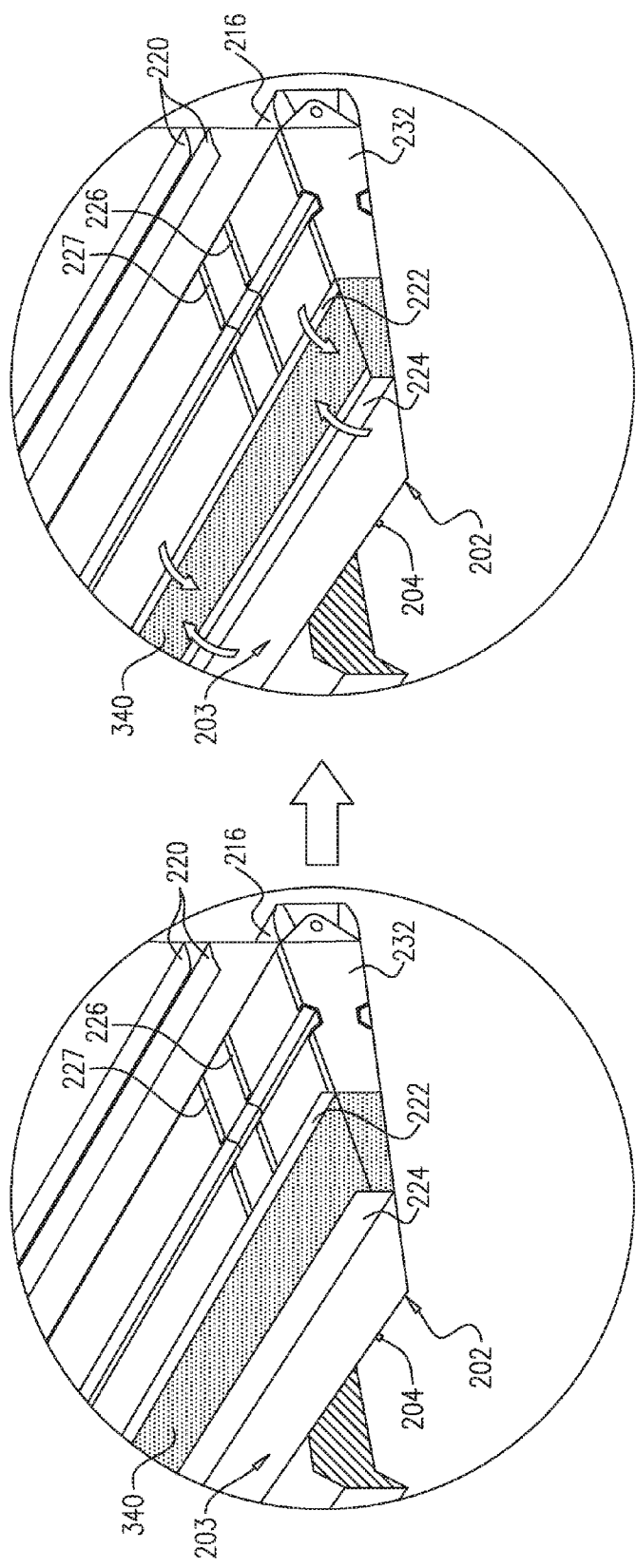
FIG. 14 is a simplified pictorial illustration of reorientation of spar defining protrusions on an inner side of the preform of FIG. 13 in accordance with a preferred embodiment of the present invention.

Reference is now made to FIG. 13, which is a simplified pictorial illustration of placement of mid bay tooling on an inner side of the preform of FIG. 12, and to FIG. 14, which is a simplified pictorial illustration of reorientation of spar defining protrusions on an inner side of the preform of FIG. 13.

As seen in FIG. 13, mid bay tooling 340 is placed on an inner side of the preform of FIG. 12. Preferably, mid bay tooling 340 comprises a single elongate tool element and is placed between spar defining protrusions 222 and 224. FIG. 14 is a simplified pictorial illustration of reorientation of spar defining protrusions 222 and 224 by folding a top edge of each over mid bay tool element 340.

Figure 15:
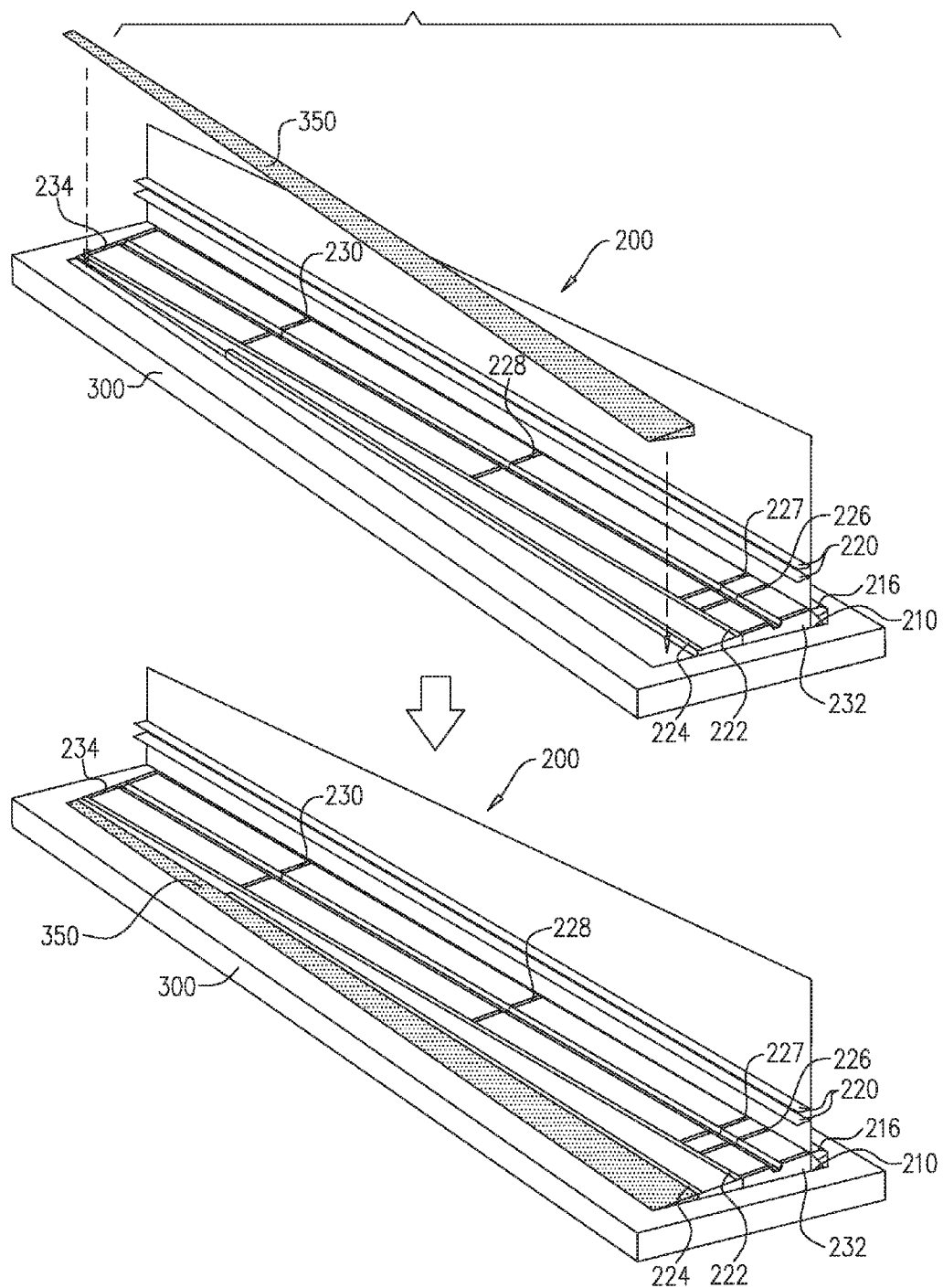
FIG. 15 is a simplified pictorial illustration of placement of aft bay tooling on an inner side of the preform of FIG. 14 in accordance with a preferred embodiment of the present invention.

Reference is now made to FIG. 15, which is a simplified pictorial illustration of placement of aft bay tooling 350 on an inner side of the preform of FIG. 14. Preferably, aft bay tooling 350 comprises a single elongate tool element and is placed adjacent spar defining protrusion 224.

Figure 16:
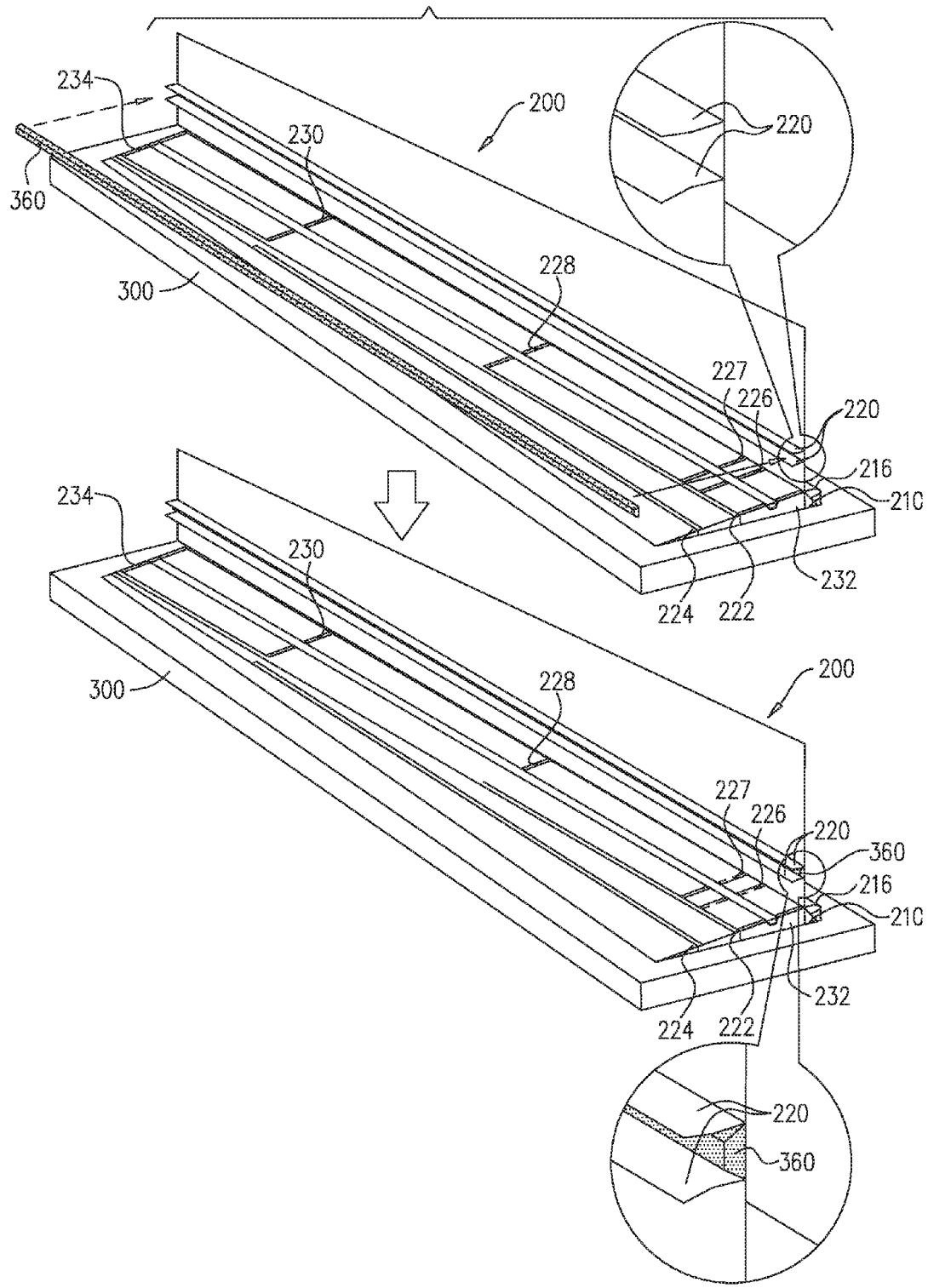
FIG. 16 is a simplified pictorial illustration of second placement of stiffener tooling on an inner side of the preform of FIG. 15 in accordance with a preferred embodiment of the present invention.
Figure 17:
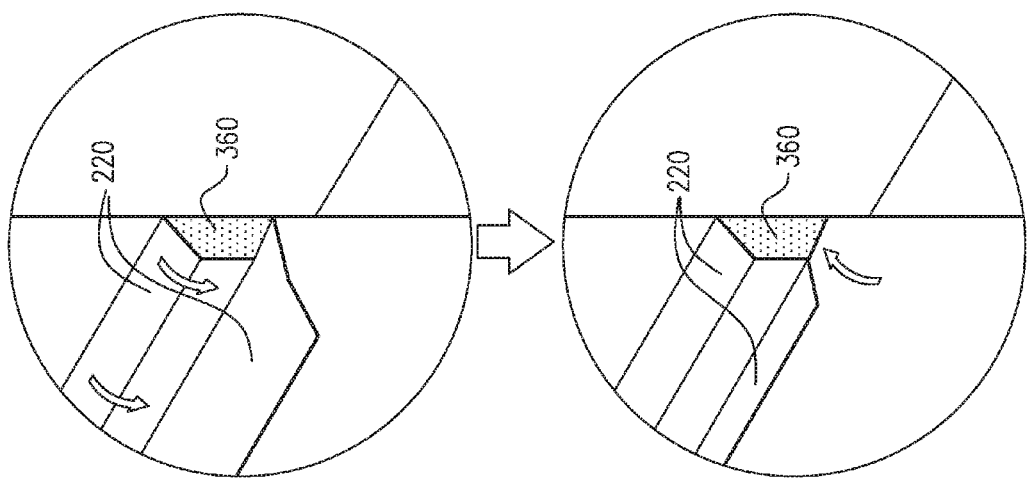
FIG. 17 is a simplified pictorial illustration of four general stages in folding stiffener protrusions over stiffener tooling on an inner side of the preform of FIG. 16 in accordance with a preferred embodiment of the present invention.

Reference is now made to FIG. 16, which is a simplified pictorial illustration of placement of another stiffener tooling on an inner side of the preform of FIG. 15, and to FIG. 17, which is a simplified pictorial illustration of four general stages in folding stiffener protrusions over stiffener tooling on an inner side of the preform of FIG. 16.

As seen in FIG. 16, stiffener tooling 360 is placed on an inner side of the preform of FIG. 15 in accordance with a preferred embodiment of the present invention. The stiffener tooling 360 is typically an elongate element having a generally trapezoidal cross section and is placed between protrusions 220. FIG. 17 shows four typical stages in folding protrusions 220 over stiffener tooling 360.

Figure 18:
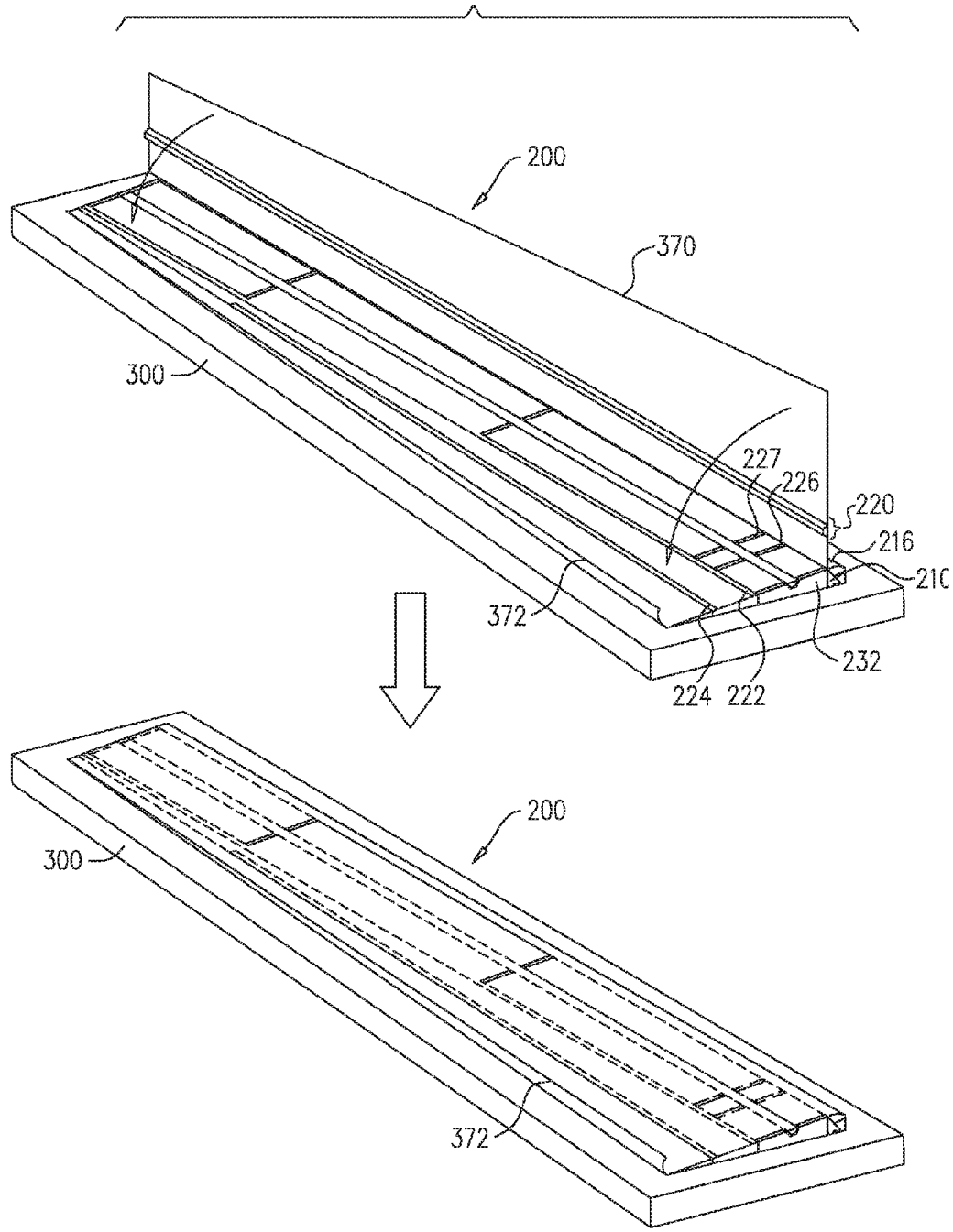
FIG. 18 is a simplified pictorial illustration of a further folding stage preformed on the preform of FIG. 17 in accordance with a preferred embodiment of the present invention.

Reference is now made to FIG. 18, which is a simplified pictorial illustration of a further folding stage performed on the preform of FIG. 17 in accordance with a preferred embodiment of the present invention. Here it is seen that skin 202 is folded over such that its axial edges 370 and 372 approximately meet.

Figure 19:
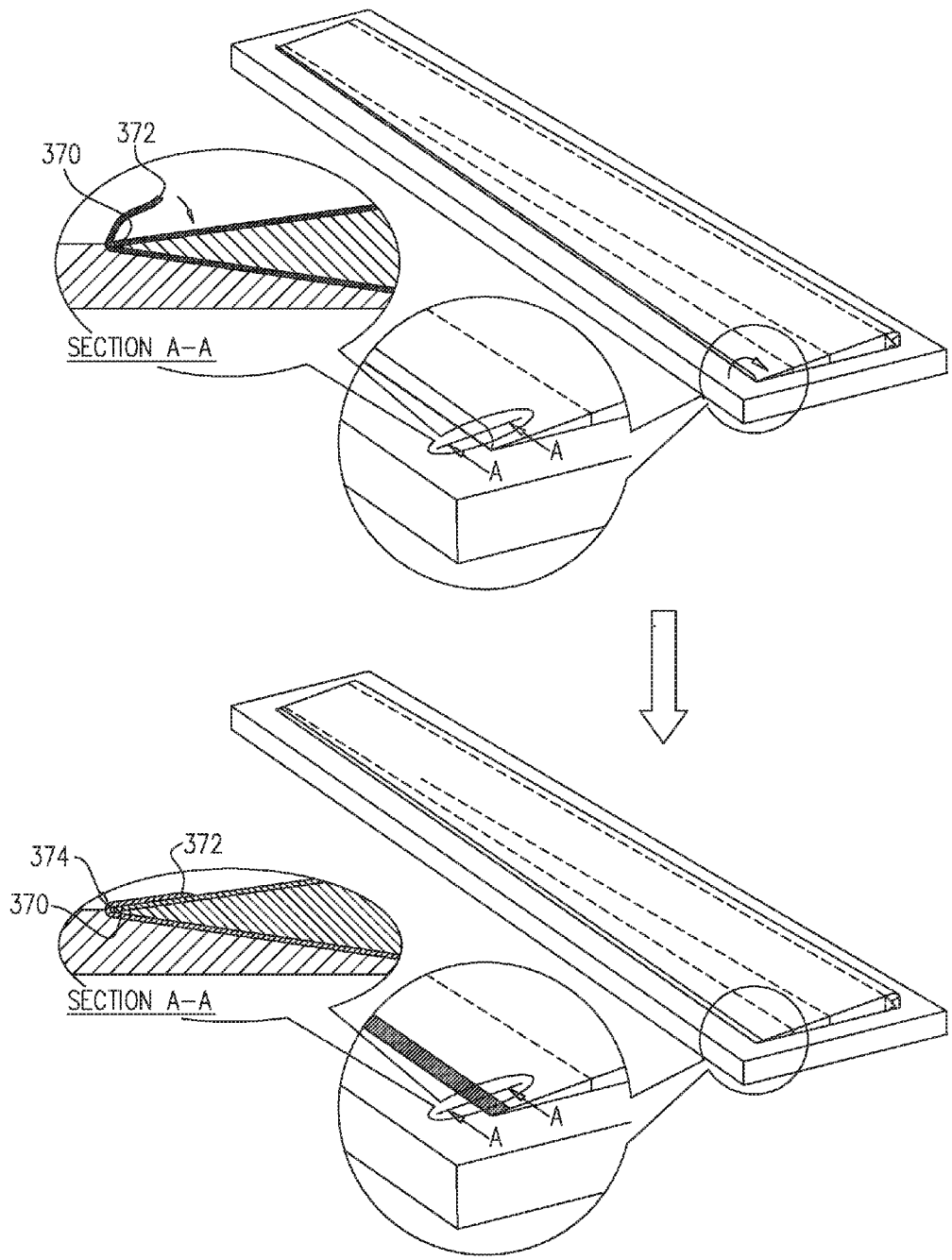
FIG. 19 is a simplified pictorial illustration of a final folding stage preformed on the preform of FIG. 18 in accordance with a preferred embodiment of the present invention.

Reference is now made to FIG. 19, which is a simplified pictorial illustration of a final folding stage performed on the preform of FIG. 18. As seen in FIG. 19, axial edge 372 is folded over axial edge 370 to define a trailing edge 374.

Figure 20:
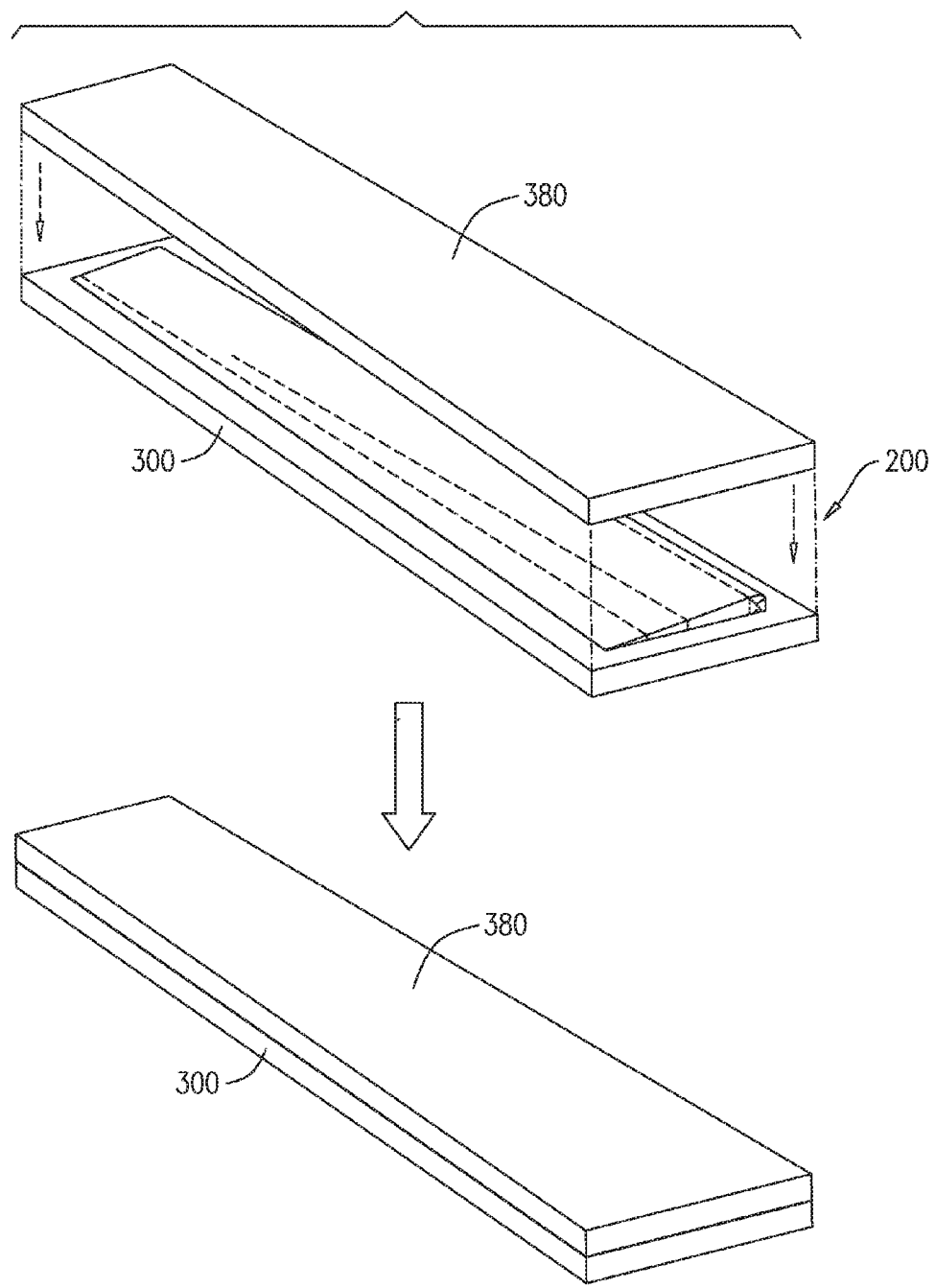
FIG. 20 is a simplified pictorial illustration of a placing a top mold over the preform of FIG. 19 in sealing engagement with the bottom mold in accordance with a preferred embodiment of the present invention.

Reference is now made to FIG. 20, which is a simplified pictorial illustration of placing a top mold 380 over the preform of FIG. 19 in sealing engagement with the bottom mold 300 in accordance with a preferred embodiment of the present invention.

Figure 21:
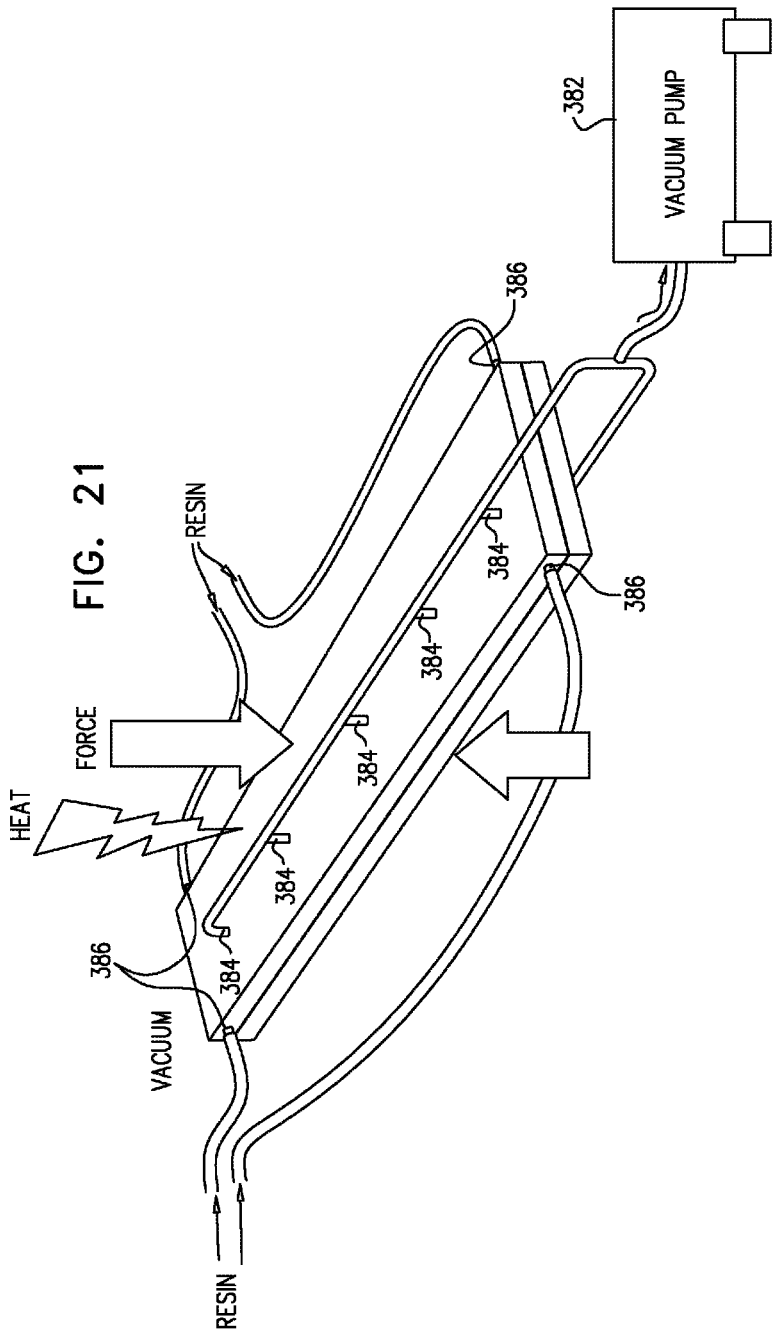
FIG. 21 is a simplified pictorial illustration of a resin application and curing stage carried out in accordance with a preferred embodiment of the present invention.

Reference is now made to FIG. 21, which is a simplified pictorial illustration of a resin application and curing stage carried out in accordance with a preferred embodiment of the present invention. Typically, a vacuum is applied to the interior of molds 300 and 380, using a vacuum pump 382 connected to various apertures 384 formed in top mold 380, and resin, such as RTM6, is injected via injection apertures 386 formed in either or both top and bottom molds 300 and 380, while the top and bottom molds 300 and 380 are securely held in place against expansion and heat is applied. Various methods of resin application exist, collectively known as Liquid Compound Molding (LCM) methods, such as Resin Transfer Molding (RTM) and its variants.

Figure 22:
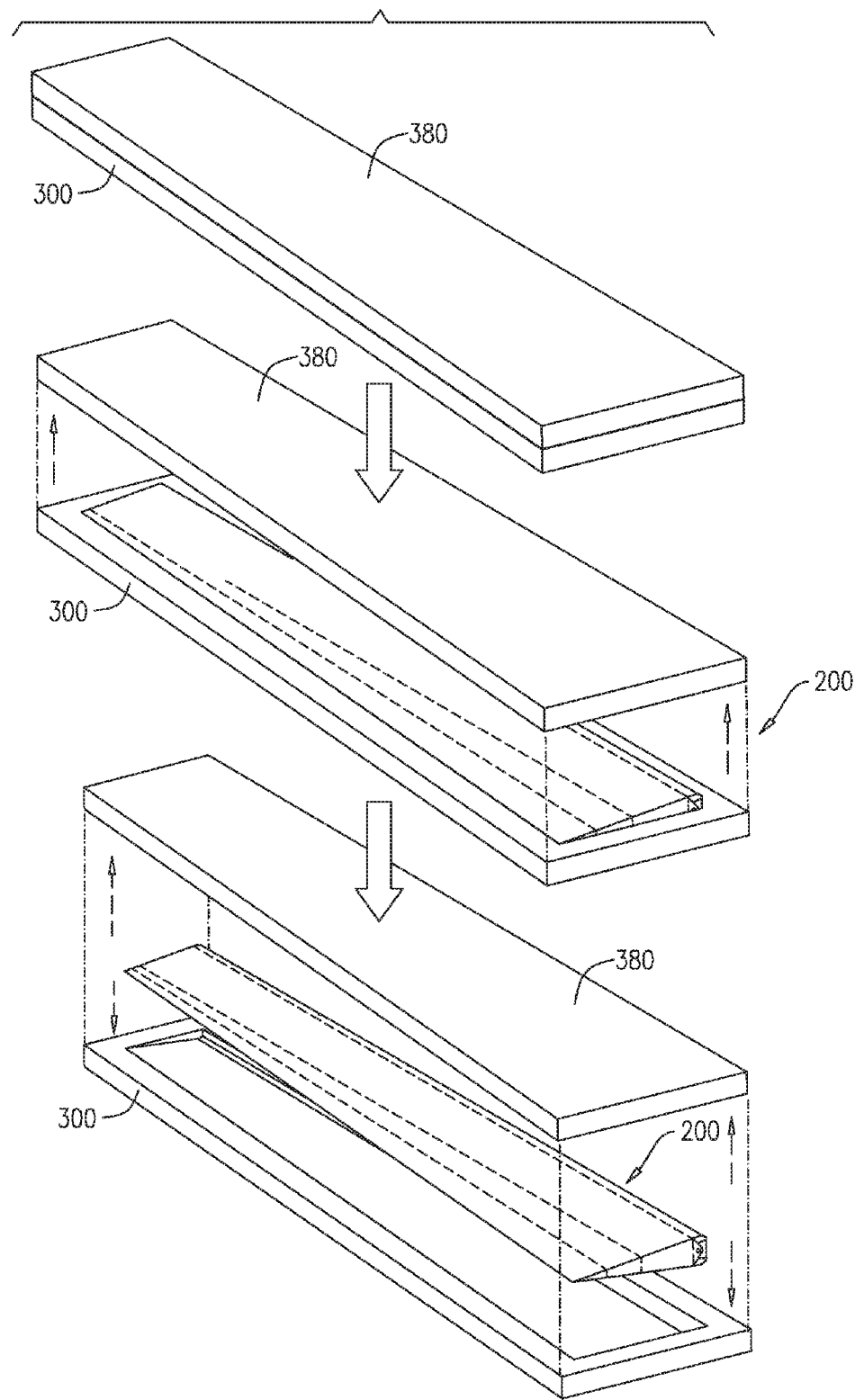
FIG. 22 is a simplified pictorial illustration of separation of the top and bottom molds and extraction of the cured resin-infused preform of FIG. 21 in accordance with a preferred embodiment of the present invention.

Reference is now made to FIG. 22, which is a simplified pictorial illustration of separation of the top and bottom molds 300 and 380 and extraction of the cured resin-infused preform of FIG. 21 in accordance with a preferred embodiment of the present invention.

Figure 23:
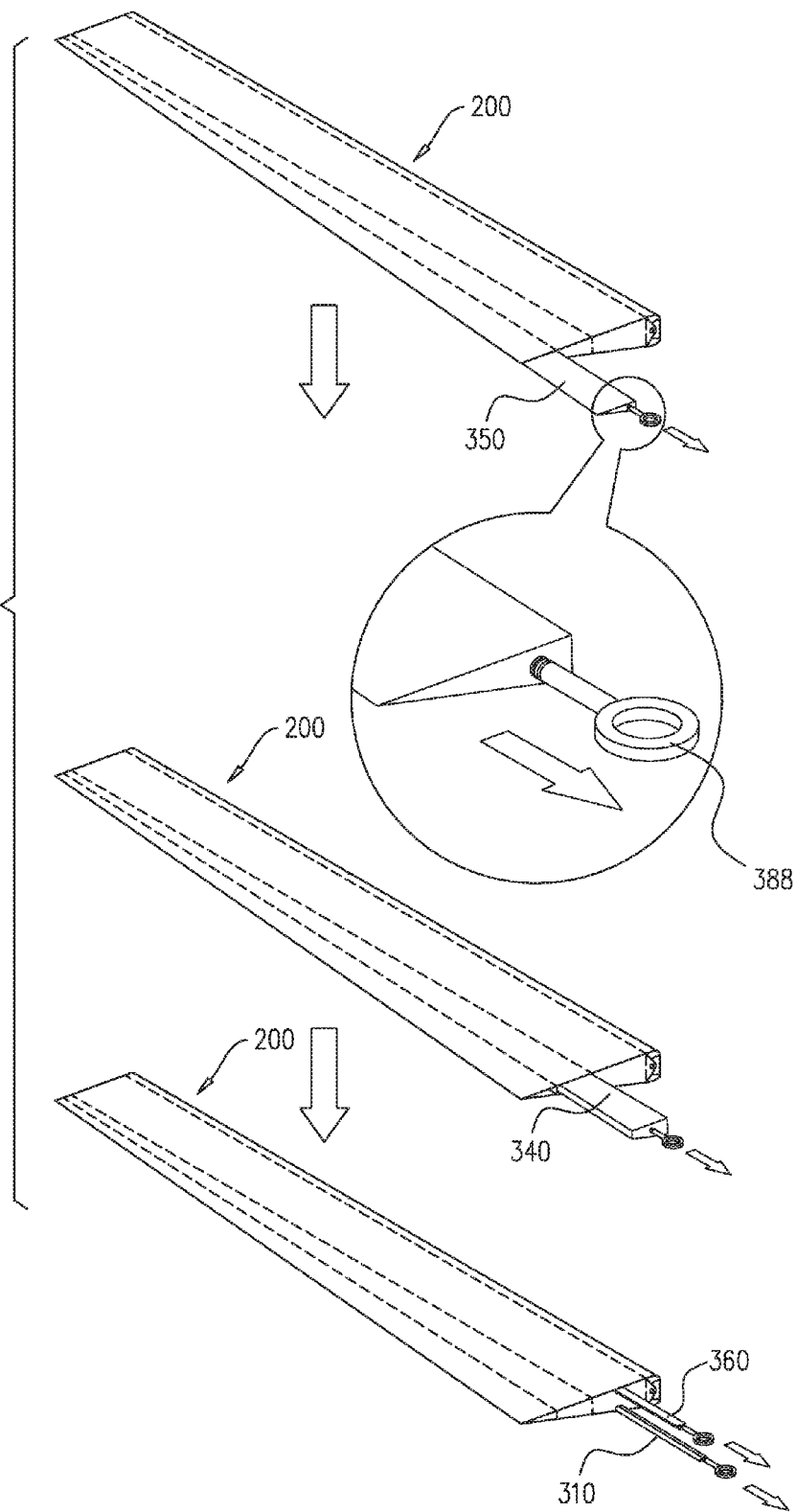
FIG. 23 is a simplified pictorial illustration of extraction of the stiffener tooling, mid bay tooling and aft bay tooling from the cured resin-infused preform of FIG. 22 in accordance with a preferred embodiment of the present invention.

Reference is now made to FIG. 23, which shows extraction of aft bay tooling 350, mid bay tooling 340, and stiffener tooling 310 & 360 from the cured resin-infused preform 200 of FIG. 22 in accordance with a preferred embodiment of the present invention. Preferably, a hook 388 is inserted into tooling to facilitate extraction thereof from preform 200.

Reference is now made to FIG. 24, which is a simplified pictorial illustration of four general stages in extraction of leading edge tool assemblies 302 from the cured resin-infused preform 200 of FIG. 23 in accordance with a preferred embodiment of the present invention. It is seen that initially the keystone tool portion 308 is removed, followed by the upper tool portion 306 and by the lower tool portion 304.

Reference is now made to FIG. 25, which is a simplified pictorial illustration of one example of a technique for removal of trapped tools, typically the forward bay tooling 320, from the cured resin-infused preform 200 of FIG. 24. In the illustrated embodiment, holes 390 are drilled in spar 102 and water is injected into the forward bay therethrough, causing the forward bay tooling to disintegrate and be washed out of the forward bay through the holes 390. Alternatively, meltable forward bay tooling 320, such as wax-based tooling, may be employed and removed by melting thereof. Alternatively, the forward bay tooling 320 may include various washable and soluble tools, such as tools based on ceramics, salts, and soluble polymers, flexible inflatable tools filled with a granular material, such as hollow spheres and shape stabilized by vacuum, collapsible tools and any other suitable tooling.

It is appreciated that the completed structure of the present invention has continuous fibers which connect the parts of the structure at the most important interfaces between parts, such as spar to skin and stiffener to skin, which provides increased structural integrity and high damage tolerance properties to the completed structure.

It is appreciated that additional layers may also be included in areas that require additional strength in the completed structure.

In a further alternative embodiment of the present invention, additional layers, particularly in areas requiring additional strength in the completed structure, may be applied to the tooling instead of being included in the preform.

It is appreciated that the shape and number of the stiffeners and the stiffener tooling may be of any suitable shape and number as required for the completed structure.

It is appreciated that while the illustrated embodiment shows an elevator, the method of the present invention may be utilized, inter alia, for other control surfaces, such as a rudder or aileron, forming a part of an aircraft, as well as for lift surfaces, for example, a wing or stabilizer, forming a part of an aircraft.

It will be appreciated that the present invention is not limited by the claims which follow and include both combinations and subcombinations of various features described and illustrated, as well as modifications and additions thereto which would occur to persons skilled in the art upon reading the foregoing and which are not in the public domain.

The invention claimed is:

1. A method for producing structures from composite materials, the method comprising:
    forming a three-dimensional preform including at least one skin and a plurality of protrusions extending from said at least one skin, said forming a three-dimensional preform including utilizing a three-dimensional weaving process to form at least a portion of said three-dimensional preform, said at least a portion of said three-dimensional prefrom comprising a three-dimensional woven preform, including a skin and multiple protrusions, wherein the skin and the protrusions are integrally joined together by continuous fibers in a three-dimensional woven structure;
    folding said three-dimensional preform such that at least some of said plurality of protrusions lie adjacent to either:
        another one of said plurality of protrusions; or
        said at least one skin; and
    applying resin to said folded three-dimensional preform and curing, thereby to produce said structures from adjacent pairs of said protrusions or from some of said protrusions and said at least one skin.

2. A method to producing structures from composite materials according to claim 1 and wherein said structure forms a part of an aircraft.

3. A method for producing structures from composite materials according to claim 1 and wherein said structure defines a movable control surface.

4. A method for producing structures from composite materials according to claim 1 and wherein said structure defines a lift surface.

5. A method for producing structures from composite materials according to claim 1 and wherein said preform includes at least one spar precursor.

6. A method for producing structures from composite materials according to claim 1 and wherein said preform includes at least one rib precursor.

7. A method for producing structures from composite materials according to claim 1 and wherein said preform includes at least one stiffener precursor.

8. A method for producing structures from composite materials according to claim 1 and wherein said preform includes at least one hinge precursor.

9. A method for producing structures from composite materials according to claim 1 and wherein said preform includes at least one internal connecting element precursor.

* * * * *